(12) United States Patent
Nagatsu et al.

(10) Patent No.: US 10,337,427 B2
(45) Date of Patent: Jul. 2, 2019

(54) CONTROL DEVICE OF COMPRESSION SELF-IGNITION ENGINE

(71) Applicant: Mazda Motor Corporation, Aki-gun, Hiroshima (JP)

(72) Inventors: Kazuhiro Nagatsu, Hiroshima (JP); Takashi Kaminaga, Hiroshima (JP); Toru Miyamoto, Higashihiroshima (JP); Mingzhao Xie, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 23 days.

(21) Appl. No.: 15/868,067

(22) Filed: Jan. 11, 2018

(65) Prior Publication Data

US 2018/0283296 A1    Oct. 4, 2018

(30) Foreign Application Priority Data

Mar. 30, 2017  (JP) ................. 2017-067930

(51) Int. Cl.
*F02D 41/00*     (2006.01)
*F02B 11/02*     (2006.01)
(Continued)

(52) U.S. Cl.
CPC ............ *F02D 41/006* (2013.01); *F02B 11/02* (2013.01); *F02B 33/40* (2013.01); *F02B 39/12* (2013.01);
(Continued)

(58) Field of Classification Search
CPC .... F02D 41/00; F02D 41/006; F02D 41/0007; F02D 41/30; F02D 41/3035; F02D 3/02; F02D 3/0207; F02D 3/0261; F02D 3/0265; F02B 11/02; F02B 33/40; F02B 39/12

USPC ............ 123/406.11, 406.23, 406.24, 406.35, 123/568.16, 568.21; 701/102, 105, 108, 701/110
See application file for complete search history.

(56) References Cited

U.S. PATENT DOCUMENTS

| | | | |
|---|---|---|---|
| 2009/0228187 A1* | 9/2009 | Nakamura | F01L 1/022 701/103 |
| 2010/0030451 A1* | 2/2010 | Lippa | F02D 19/0684 701/104 |
| 2016/0160710 A1* | 6/2016 | Roth | F02D 41/12 123/90.11 |

FOREIGN PATENT DOCUMENTS

JP      2015098802 A     5/2015

* cited by examiner

*Primary Examiner* — John Kwon
*Assistant Examiner* — Johnny H Hoang
(74) *Attorney, Agent, or Firm* — Alleman Hall Creasman & Tuttle LLP

(57) ABSTRACT

A control device for a compression self-ignition combustion engine is provided, which includes a variable valve operating system configured to introduce internal exhaust gas recirculation (EGR) gas into a combustion chamber, a boosting system configured to boost intake air, a controller configured to control the valve operating system, and a sensor connected to the controller and configured to detect a parameter related to an operating state of the engine. An operation mode of the valve operating system is switchable between first and second modes. The boosting system boosts the intake air when an engine load is higher than a given load, and does not boost when lower than the given load. When the engine load is high, the controller controls the valve operating system to operate in the first mode, and when the load is low, the controller controls the valve operating system to operate in the second mode.

10 Claims, 14 Drawing Sheets

(51) Int. Cl.
    *F02B 33/40*     (2006.01)
    *F02B 39/12*     (2006.01)
    *F02D 41/30*     (2006.01)
    *F02D 13/02*     (2006.01)
    *F02D 41/40*     (2006.01)
    *F02B 11/00*     (2006.01)

(52) U.S. Cl.
CPC ..... F02D 13/0207 (2013.01); F02D 13/0261 (2013.01); F02D 13/0265 (2013.01); F02D 41/0007 (2013.01); F02D 41/3035 (2013.01); *F02B 11/00* (2013.01); *F02D 41/402* (2013.01); *F02D 2041/001* (2013.01); *Y02T 10/144* (2013.01); *Y02T 10/18* (2013.01); *Y02T 10/47* (2013.01)

CONTROL DEVICE OF COMPRESSION SELF-IGNITION ENGINE

TECHNICAL FIELD

The present disclosure relates to a control device of a compression self-ignition engine.

BACKGROUND OF THE DISCLOSURE

JP2015-098802A discloses an engine which introduces internal EGR gas into a combustion chamber within an operating range in which mixture gas in the combustion chamber is combusted by self-ignition. This engine includes a valve operating mechanism for opening an exhaust valve, and an operation mode of the valve operating mechanism is switchable between a normal mode and a special mode. For example, in the normal mode, the exhaust valve is opened on exhaust stroke, and in the special mode, the exhaust valve is opened on the exhaust stroke and intake stroke. The valve operating mechanism has a first cam and a second cam. The first cam is selected in the normal mode and has one cam nose. The second cam is selected in the special mode and has two cam noses. Specifically, the second cam has a cam profile in which, after the exhaust valve is opened, a lift gradually increases to a highest lift and then gradually decreases. This gradual decrease does not bring the lift directly to zero, but maintains the lift at a given lift, which is lower than the highest lift, and then brings it to zero. Thus, in the special mode, the exhaust valve is opened on the intake stroke. In the engine described in JP2015-098802A, when the internal EGR gas is introduced into the combustion chamber, a controller operates the valve operating mechanism of the exhaust valve in the special mode. Thus, the exhaust valve opens on the intake stroke, and a part of exhaust gas discharged to an exhaust port during the exhaust stroke is reintroduced into the combustion chamber. Further, by adjusting an internal exhaust gas recirculation (EGR) ratio (a weight ratio of internal EGR gas to a weight of the entire gas introduced into the combustion chamber), a temperature state inside the combustion chamber is suitably maintained and the mixture gas is stably combusted by self-ignition.

In the engine described in JP2015-098802A, the self-ignition combustion of the mixture gas inside the combustion chamber is limited to be performed within a narrow operating range where an engine load is low. In this regard, a fuel efficiency of the engine improves by extending this operating range to a higher engine load side.

Therefore, a case may be considered that an engine includes a booster for boosting intake air introduced into a combustion chamber, and within a high engine load range, intake air is boosted so that a fresh air amount increases corresponding to an increase of a fuel amount. By this, the operating range in which the mixture gas is combusted inside the combustion chamber by self-ignition is extended to the higher engine load side.

However, when the exhaust valve opens on the intake stroke as described above while the booster boosts the intake air, since both the exhaust valve and the intake valve are opened on the intake stroke, blow-by of the intake air from the intake side to the exhaust side of the engine occurs. Thus, it becomes difficult to accurately adjust the amount of internal EGR gas introduced into the combustion chamber. In other words, the controllability of the internal EGR ratio degrades.

SUMMARY OF THE DISCLOSURE

The present disclosure is made in view of the above situations and aims to improve controllability of an internal EGR ratio of a compression self-ignition engine.

According to one aspect of the present disclosure, a control device for a compression self-ignition combustion engine configured to combust mixture gas inside a combustion chamber by self-ignition is provided, which includes a variable valve operating system configured to introduce internal exhaust gas recirculation (EGR) gas into the combustion chamber by changing an opening operation of at least an exhaust valve out of an intake valve and the exhaust valve, a boosting system configured to boost intake air introduced into the combustion chamber, a controller configured to output a control signal to at least the variable valve operating system so as to operate the engine, and a sensor connected to the controller and configured to detect a parameter related to an operating state of the engine and output a detection signal to the controller.

An operation mode of the variable valve operating system is switchable between a first mode in which the exhaust valve is closed before a top dead center of exhaust stroke to confine the internal EGR gas inside the combustion chamber and a second mode in which the exhaust valve is opened on intake stroke to introduce the internal EGR gas into the combustion chamber. In an operating range of the engine where the engine operates by self-ignition combustion, when an engine load is higher than a given load, the boosting system boosts the intake air introduced into the combustion chamber, and when the engine load is lower than the given load, the boost of the intake air is prevented. When the engine load is higher than the given load, the controller outputs a control signal to the variable valve operating system to cause the variable valve operating system to operate in the first mode, and when the engine load is lower than the given load, the controller outputs a control signal to the variable valve operating system to cause the variable valve operating system to operate in the second mode.

The operating range where the engine operates by self-ignition combustion may include a first range and a second range where the engine load is lower than the first range, the boosting system may boost the intake air introduced into the combustion chamber within the first range, and the boost of the intake air may be prevented within the second range. Within the first range, the controller may output a control signal to the variable valve operating system to cause the variable valve operating system to operate in the first mode, and within the second range, the controller may output a control signal to the variable valve operating system to cause the variable valve operating system to operate in the second mode.

With the configuration, within the second range where the load is relatively low in the operating range of the engine where the engine operates by self-ignition combustion, the boosting system does not boost the intake air. That is, the engine operates in a naturally aspirated state. The controller operates the variable valve operating system in the second mode in which the exhaust valve is opened on the intake stroke, thus the internal EGR gas is introduced into the combustion chamber. On the intake stroke, although both the intake and exhaust valves are opened, since the boosting system does not boost the intake air, blow-by of the intake air from the intake side to the exhaust side is prevented. Thus, it becomes possible to accurately adjust the amount of the internal EGR gas introduced into the combustion chamber. In other words, within the second range, the controllability of an internal EGR ratio is secured.

Further, by opening the exhaust valve on the intake stroke, a large amount of exhaust gas is introduced into the combustion chamber. In order to stabilize self-ignition combustion within the second range where the load is relatively low, it is required to increase a temperature inside the combustion chamber; however, since the engine load is low, an amount of fuel is small and a temperature of the exhaust gas is relatively low. By opening the exhaust valve on the intake stroke and introducing the large amount of exhaust gas into the combustion chamber, the temperature inside the combustion chamber is increased when the exhaust gas temperature is low. That is, operating the variable valve operating system in the second mode within the second range is advantageous in increasing the temperature of the combustion chamber and thus stabilizing self-ignition combustion.

On the other hand, within the first range where the load is relatively high in the operating range of the engine where the engine operates by self-ignition combustion, the boosting system boosts the intake air. The controller operates the variable valve operating system in the first mode in which the exhaust valve is closed before the top dead center of exhaust stroke. A negative overlap period in which the exhaust and intake valves are both closed is provided around the top dead center of the exhaust stroke. Thus, the internal EGR gas is confined inside the combustion chamber. On the intake stroke, since the exhaust valve and the intake valve do not open simultaneously, even when the boosting system boosts the intake air, the blow-by of the intake air from the intake side to the exhaust side does not occur. Thus, it becomes possible to accurately adjust the amount of the internal EGR gas introduced into the combustion chamber. In other words, also within the first range, the controllability of the internal EGR ratio is secured.

By providing the negative overlap period of the exhaust and intake valves to introduce the internal EGR gas into the combustion chamber, the introduction amount of the internal EGR gas becomes smaller than when the internal EGR gas is introduced into the combustion chamber by opening the exhaust valve on the intake stroke. However, in order to stabilize self-ignition combustion within the first range where the load is relatively high, the temperature inside the combustion chamber may be relatively low. Further, since the fuel amount is large within the first range, the temperature of the exhaust gas is high. Therefore, even if the introduction amount of the internal EGR gas into the combustion chamber is small, the temperature inside the combustion chamber is desirably increased.

When an operating state of the engine shifts from the second range to the first range, the controller may output control signals to the variable valve operating system and the boosting system to cause the variable valve operating system to switch the operation mode from the second mode to the first mode and the boosting system to start boosting the intake air after the operation mode is switched.

In this manner, when the boost of the intake air is started, the exhaust valve and the intake valve do not open simultaneously on the intake stroke, and therefore, the blow-by of the intake air is reliably prevented. Thus, the controllability of the internal EGR ratio improves.

The boosting system may include a supercharger that is driven by the engine, and a clutch provided between the engine and the supercharger, and configured to perform and interrupt transmission of driving force from the engine to the supercharger. The controller may output a control signal to the clutch to cause the clutch to be connected after the operation mode of the variable valve operating system switches from the second mode to the first mode.

With the configuration, the start and stop of the boost of the intake air by the boosting system is controlled with high responsivity. The variable valve operating system and the boosting system cooperate with each other to improve the controllability of the internal EGR ratio.

When the operating state of the engine shifts from the first range to the second range, the controller may output a control signal to the variable valve operating system to cause the variable valve operating system to switch the operation mode from the first mode to the second mode after boost pressure of the boosting system drops to a given pressure.

In this manner, since the boost pressure drops to the given pressure when both of the intake and exhaust valves are opened on the intake stroke, the blow-by of the intake air is prevented. Thus, the controllability of the internal EGR ratio improves.

The engine may operate by combusting the mixture gas at a theoretical air-fuel ratio by spark-ignition within a third range where the engine load is higher than the first range. Within the first range, the controller may output a control signal to the boosting system so that boost pressure increases as the engine load increases. The controller may output a control signal to the boosting system so that the boost pressure drops once at a timing when the operating state of the engine shifts from the first range to the third range.

If the engine load increases and the fuel amount increases, it becomes difficult to reduce combustion noise when the mixture gas is combusted by self-ignition. Thus, within the third range where the engine load is high, it is preferable to operate the engine by combusting the mixture gas at a theoretical air-fuel ratio by spark-ignition.

Here, within the first range where self-ignition combustion is performed, it is preferable to increase the boost pressure as the engine load increases, i.e., as the fuel amount increases, so that the introduction amount of gas into the combustion chamber is increased. However, it is required to bring the mixture gas to be the theoretical air-fuel ratio at the timing when the operating state of the engine shifts from the first range to the third range. Note that "the theoretical air-fuel ratio" here may have a range for the theoretical air fuel ratio to remain within a purification window of the three-way catalyst, for example.

Thus, the controller outputs the control signal to the boosting system so that the boost pressure drops once at the timing when the operating state of the engine shifts from the first range to the third range. With the configuration, an introduction amount of fresh air into the combustion chamber is reduced and thus the air-fuel ratio of the mixture gas becomes the theoretical air-fuel ratio. Within the third range, the spark ignition combustion is stably performed.

The boosting system may boost the intake air introduced into the combustion chamber within the third range. Within the third range, the controller may output a control signal to the variable valve operating system to cause the variable valve operating system to operate in a third mode in which both of the intake and exhaust valves open around the top dead center of the exhaust stroke so as to scavenge exhaust gas inside the combustion chamber.

That is, within the third range, the combination of both of the intake and exhaust valves being opened around the top dead center of the exhaust stroke (i.e., a positive overlap period of the intake and exhaust valves is provided) and the boosting system boosting the intake air facilitates scavenging of the exhaust gas inside the combustion chamber. Thus, the temperature inside the combustion chamber is reduced.

Within the third range, since the engine load is high, an abnormal combustion such as pre-ignition and knocking may occur; however, by scavenging the exhaust gas inside the combustion chamber as described above, the abnormal combustion is prevented, which is advantageous in improving a fuel efficiency within the third range where spark-ignition combustion is performed.

The variable valve operating system may include a first cam configured to be selected in the first mode and open the exhaust valve on the exhaust stroke, a second cam configured to be selected in the second mode and open the exhaust valve on the exhaust stroke and the intake stroke, and a switch mechanism configured to switch the operating cam between the first and second cams. The controller may output a control signal to the variable valve operating system to switch the operating cam between the first and second cams according to the operating state of the engine.

Here, the second cam may open the exhaust valve on the exhaust stroke, close once, and then open again on the intake stroke. Alternatively, the second cam may open the exhaust valve on the exhaust stroke, keep it open over a given period of time, and then close it on the intake stroke.

With this configuration, by switching between the first and second cams, the operation mode is quickly switched between the first mode and second mode.

The variable valve operating system may include a variable valve timing mechanism configured to change an operating timing of the exhaust valve. When the variable valve operating system operates in the first mode, an internal EGR ratio within the combustion chamber may increase as the operating timing of the exhaust valve is advanced, when the variable valve operating system operates in the second mode, the internal EGR ratio may increase as the operating timing of the exhaust valve is retarded, and when the operating timing of the exhaust valve is a specific operating timing, the internal EGR ratio in the first mode may be the same as the internal EGR ratio in the second mode. When the operating state of the engine shifts between the first range and the second range, the controller may output a control signal to the variable valve operating system to cause the variable valve operating system to switch the operation mode between the first mode and the second mode when the operating timing of the exhaust valve is the specific operating timing.

Thus, when the operation mode of the variable valve operating system is switched between the first mode and the second mode, since the operating timing of the exhaust valve is the specific operating timing, the internal EGR ratio is not changed. Therefore, when the operating state of the engine shifts between the first range and the second range, the internal EGR ratio inside the combustion chamber does not change, which prevents unstable self-ignition combustion.

The controller may output a control signal to the variable valve operating system so that the internal EGR ratio continuously decreases as the engine load increases over the entire first and second ranges.

Thus, within the first and second ranges where the mixture gas is combusted by self-ignition, the temperature inside the combustion chamber is suitably adjusted according to the engine load. As a result, self-ignition combustion is stabilized.

In addition, since the internal EGR ratio does not change when the operation mode of the variable valve operating system is switched between the first and second modes by switching between the first and second cams, the continuity of the internal EGR ratio is maintained at a boundary between the first and second ranges.

DETAILED DESCRIPTION OF THE DISCLOSURE

Figure 1:
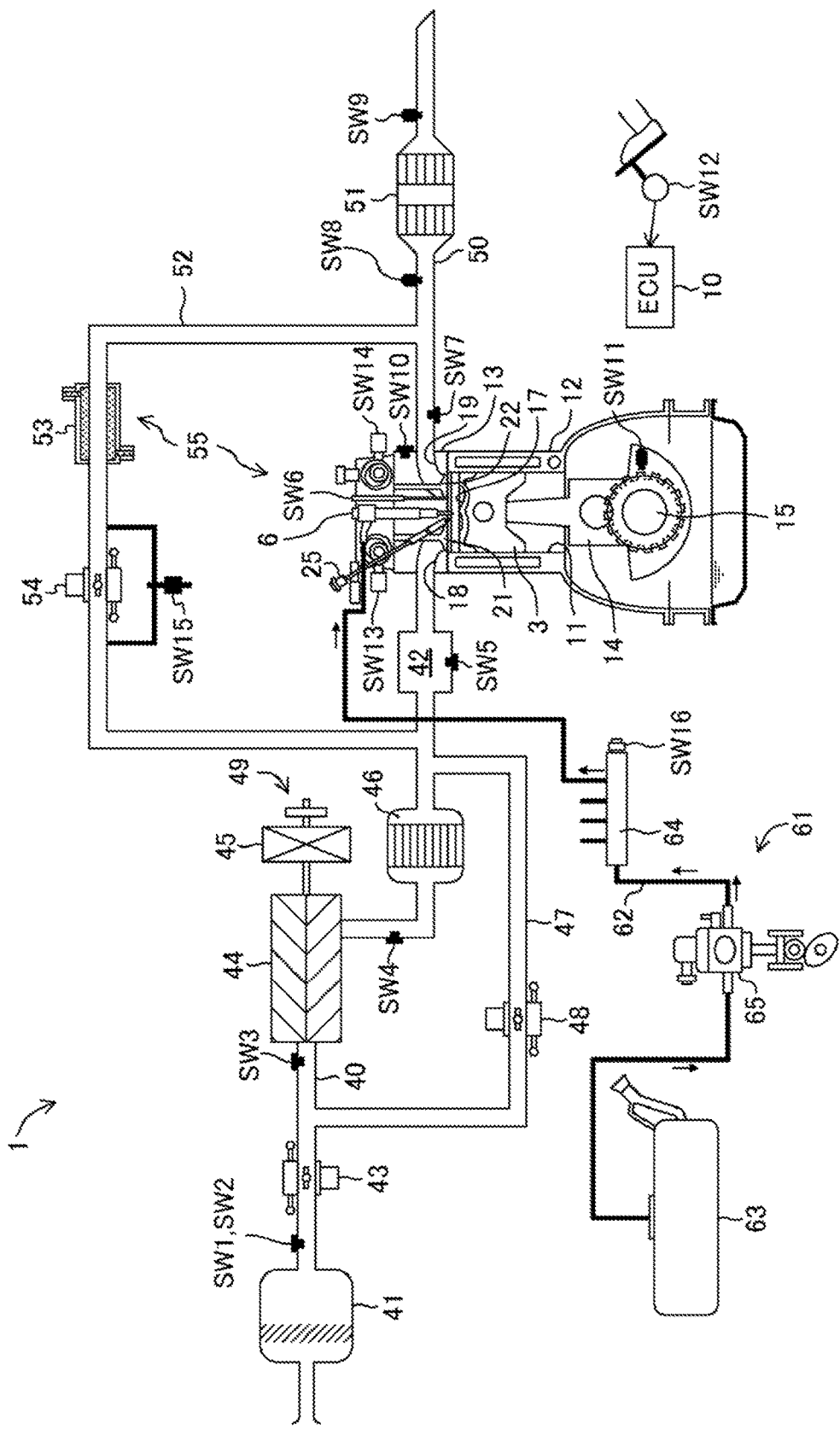
FIG. 1 is a view illustrating a configuration of a compression self-ignition engine.
Figure 2:
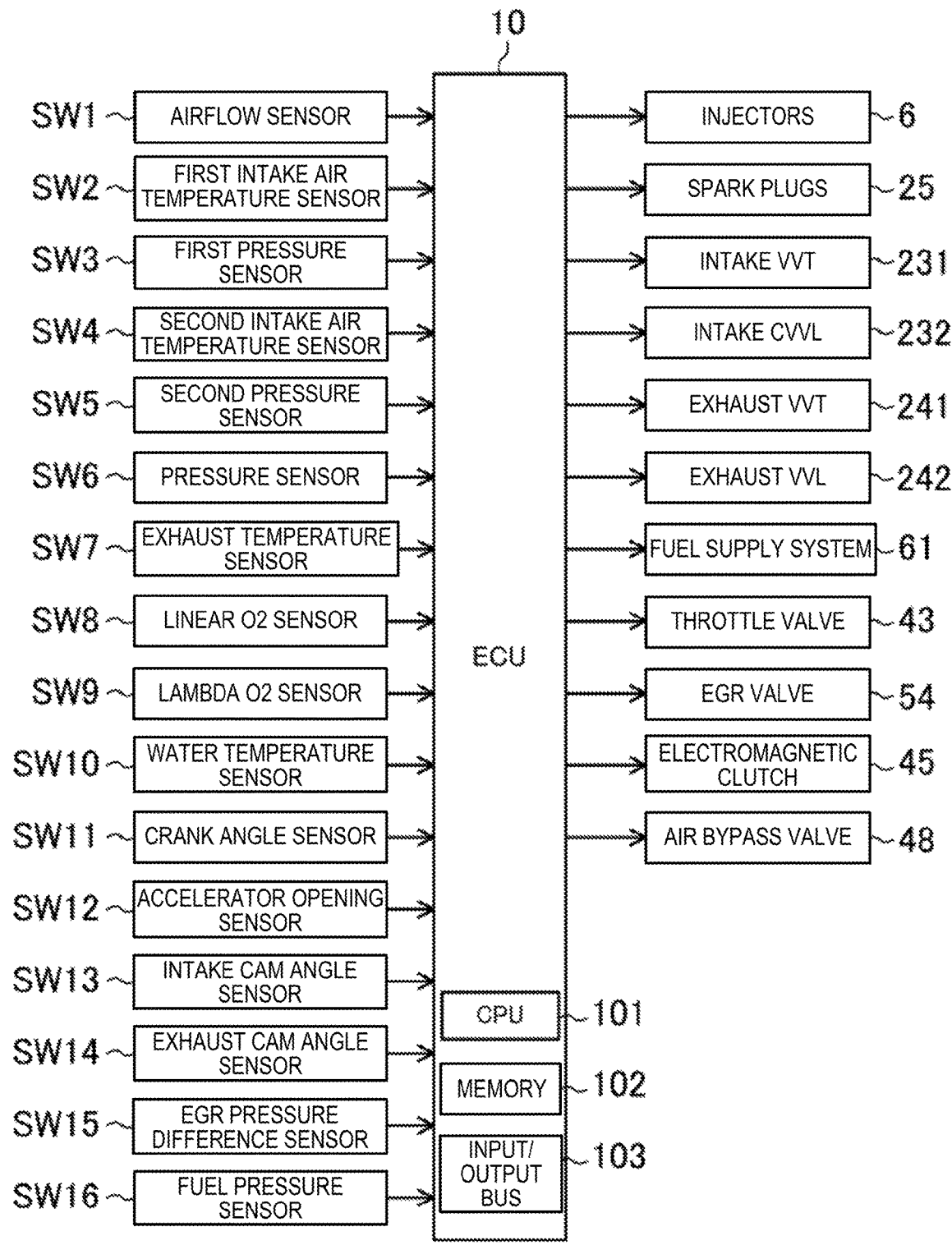
FIG. 2 is a block diagram illustrating a configuration of a control device of the compression self-ignition engine.

Hereinafter, one embodiment of a control device of a compression self-ignition engine is described in detail with reference to the accompanying drawings. Note that, the following description is one example of the control device of the compression self-ignition engine. FIG. 1 is a view illustrating a configuration of the compression self-ignition engine. FIG. 2 is a block diagram illustrating a configuration of the control device of the compression self-ignition engine.

The engine 1 is mounted on a four-wheel automobile. The automobile travels by an operation of the engine 1. Fuel of the engine 1 in this embodiment is gasoline. The gasoline may contain bioethanol, etc. The fuel of the engine 1 may be any kind of fuel as long as it is liquid fuel containing at least gasoline.

(Engine Configuration)

The engine 1 includes a cylinder block 12 and a cylinder head 13 placed on the cylinder block 12. The cylinder block 12 is formed therein with a plurality of cylinders 11. In other words, the engine 1 is a multi-cylinder engine. In FIG. 1, only one cylinder 11 is illustrated.

A piston 3 is reciprocatably inserted into each cylinder 11. The piston 3 is coupled to a crankshaft 15 via a connecting rod 14. The piston 3 forms a combustion chamber 17 together with the cylinder 11 and the cylinder head 13. Note that, the definition of "combustion chamber" is not limited to a space formed at a timing that the piston 3 reaches a top dead center on compression stroke (CTDC), and a broad definition may be applied. That is, "combustion chamber" may mean any space formed by the piston 3, the cylinder 11, and the cylinder head 13, regardless of the position of the piston 3. Although it is not illustrated in detail, the piston 3 has a flat upper surface. A cavity is formed in the upper surface of the piston 3. A lower surface of the cylinder head 13, that is, a ceiling surface of the combustion chamber 17, is formed by two inclined surfaces. The combustion chamber 17 has a so-called pent-roof shape.

A geometric compression ratio of the engine 1 is set high in order to improve a theoretical thermal efficiency and stabilize CI (Compression Ignition) combustion (i.e., self-ignition combustion) described later. For example, the geometric compression ratio of the engine 1 is 17:1 or higher. The geometric compression ratio may suitably be set within a range of 17:1 to 20:1, e.g., 18:1.

The cylinder head 13 is formed with two intake ports 18 for each cylinder 11 (FIG. 1 illustrates only one intake port 18). Each intake port 18 communicates with the combustion chamber 17. An intake valve 21 is disposed in the intake port 18. The intake valve 21 opens and closes the intake port 18 to and from the combustion chamber 17. An intake valve operating mechanism opens and closes the intake valve 21 at given timings. In this embodiment, as illustrated in FIG. 2, the intake valve operating mechanism has an intake VVT (Variable Valve Timing) 231 as a variable valve operating system and a timing changing mechanism. The intake VVT 231 is continuously variable of a rotational phase of an intake camshaft within a given angular range. The open and close timings of the intake valve 21 change continuously. Note that, the intake VVT 231 may be, for example, an electric VVT or a hydraulic VVT.

In this embodiment, as illustrated in FIG. 2, the intake valve operating mechanism also has an intake CVVL (Continuously Variable Valve Lift) 232 as a variable valve operating system and a lift change mechanism. The intake CVVL 232 continuously changes a lift of the intake valve 21 within a given range. Note that, the intake CVVL 232 may suitably adopt a known structure.

The cylinder head 13 is also formed with two exhaust ports 19 for each cylinder 11 (FIG. 1 illustrates only one exhaust port 19). Each exhaust port 19 communicates with the combustion chamber 17. An exhaust valve 22 is disposed in the exhaust port 19. The exhaust valve 22 opens and closes the exhaust port 19 to and from the combustion chamber 17. An exhaust valve operating mechanism opens and closes the exhaust valve 22 at given timings. In this embodiment, as illustrated in FIG. 2, the exhaust valve operating mechanism has an exhaust VVT (Variable Valve Timing) 241 as a variable valve operating system and a timing changing mechanism. The exhaust VVT 241 is continuously variable of a rotational phase of an exhaust camshaft within a given angular range. The open and close timings of the exhaust valve 22 change continuously. Note that, the exhaust VVT 241 may be, for example, an electric VVT or a hydraulic VVT.

In this embodiment, as illustrated in FIG. 2, the exhaust valve operating mechanism has an exhaust VVL (Variable Valve Lift) 242 as a variable valve operating system. As is described later in detail, the exhaust VVL 242 changes a lift of the exhaust valve 22 by causing one of a first cam part 811 and a second cam part 812 to open the exhaust valve 22.

As is described later in detail, the engine 1 adjusts the length of an overlap period of the open timing of the intake valve 21 and the close timing of the exhaust valve 22 by the intake valve operating mechanism and the exhaust valve operating mechanism. Thus, exhaust gas in the combustion chamber 17 is scavenged or hot exhaust gas is confined in the combustion chamber 17 (i.e., internal EGR gas is introduced into the combustion chamber 17). When the engine 1 is in a given operating state, the exhaust valve operating mechanism opens the exhaust valve 22 on intake stroke. Thus, the internal EGR gas is introduced into the combustion chamber 17.

An injector 6 is attached to the cylinder head 13 for each cylinder 11. The injector 6 injects fuel directly into the combustion chamber 17. The injector 6 is disposed so that its center axis extends along a center axis of the cylinder 11 and is oriented toward the cavity. Note that, the center axis of the injector 6 may be offset from the center axis of the cylinder 11.

Although it is not illustrated in detail, the injector 6 is constructed by a multi-port fuel injector having a plurality of nozzle ports. The injector 6 injects the fuel so that the fuel spray radially spreads from the center of the combustion chamber 17.

Note that, the injector 6 is not limited to the multi-port injector. The injector 6 may adopt an outward-opening valve injector.

A fuel supply system 61 is connected to the injector 6. The fuel supply system 61 includes a fuel tank 63 configured to store the fuel and a fuel supply path 62 connecting the fuel tank 63 with the injector 6. A fuel pump 65 and a common rail 64 are provided in the fuel supply path 62. The fuel pump 65 pumps the fuel to the common rail 64. In this embodiment, the fuel pump 65 is a plunger pump which is driven by the crankshaft 15. The common rail 64 stores the fuel pumped from the fuel pump 65 at high fuel pressure. When the injector 6 opens, the fuel stored in the common rail 64 is injected into the combustion chamber 17 from the nozzle ports of the injector 6. The fuel supply system 61 is able to supply fuel to the injector 6 at a high pressure of 30 MPa or higher. A highest fuel pressure of the fuel supply system 61 may be, for example, about 120 MPa. The pressure of the fuel supplied to the injector 6 may be changed according to the operating state of the engine 1. Note that, the structure of the fuel supply system 61 is not limited to the above structure.

A spark plug 25 is attached to the cylinder head 13 for each cylinder 11. The spark plug 25 forcibly ignites mixture gas in the combustion chamber 17. In this embodiment, the spark plug 25 is disposed at an intake side of the cylinder 11 defined by a plane including the center axis. The spark plug 25 is located between the two intake ports 18 adjacently to the injector 6. The spark plug 25 is attached to the cylinder head 13 to extend toward the center of the combustion chamber 17 in a tilted posture with respect to up-and-down directions of the cylinder head 13. Although it is not illustrated in detail, an electrode of the spark plug 25 is located near the ceiling surface of the combustion chamber 17 so as to be oriented inside of the combustion chamber 17.

An intake passage 40 is connected to one side of the engine 1. The intake passage 40 communicates with the intake ports 18 of the cylinders 11. The intake passage 40 is a passage through which gas flows to be introduced into the combustion chamber 17. An air cleaner 41 configured to filter fresh air is disposed in an upstream end part of the intake passage 40. A surge tank 42 is disposed near a downstream end of the intake passage 40. Although it is not illustrated in detail, a part of the intake passage 40 downstream of the surge tank 42 constitutes independent passages branched for the respective cylinders 11. Downstream ends of the independent passages communicate with the intake ports 18 of the cylinders 11, respectively.

A throttle valve 43 is disposed in the intake passage 40 between the air cleaner 41 and the surge tank 42. The throttle valve 43 adjusts an introduction amount of fresh air into the combustion chamber 17 by adjusting an opening thereof.

A booster 44 is disposed in the intake passage 40 downstream of the throttle valve 43. The booster 44 boosts the intake air introduced into the combustion chamber 17. In this embodiment, the booster 44 is a mechanical supercharger which is driven by the engine 1. The booster 44 may be, for example, of a Roots type. The booster 44 may have any configuration, such as a Lysholm type or a centrifugal type.

An electromagnetic clutch 45 is interposed between the booster 44 and the engine 1. The electromagnetic clutch 45 controls the flow of driving force between the booster 44 and the engine 1; for example, it may transmit driving force from the engine 1 to the booster 44 or interrupt the transmission of the driving force therebetween. As described later, an ECU 10 switches the connection state of the electromagnetic clutch 45, and thus, the on/off state of the booster 44 is switched. That is, in this engine 1, a state where the intake air to be introduced into the combustion chamber 17 is boosted by the booster 44 and a state where the intake air is not boosted by the booster 44 are switchable therebetween.

An intercooler 46 is disposed in the intake passage 40 downstream of the booster 44. The intercooler 46 cools the gas compressed in the booster 44. The intercooler 46 may be, for example, of a water cooling type.

A bypass passage 47 is connected to the intake passage 40. The bypass passage 47 connects a part of intake passage 40 upstream of the booster 44 to a part of the intake passage 40 downstream of the intercooler 46 so as to bypass the booster 44 and the intercooler 46. An air bypass valve 48 is disposed in the bypass passage 47. The air bypass valve 48 adjusts a flow rate of the gas flowing through the bypass passage 47.

When the booster 44 is turned off (that is, when the electromagnetic clutch 45 is disconnected), the air bypass valve 48 is fully opened. Thus, the gas flowing through the intake passage 40 bypasses the booster 44 and is introduced into the combustion chamber 17 of the engine 1. The engine 1 operates in a non-boosted state, that is, in a naturally aspirated state.

When the booster 44 is turned on (that is, when the electromagnetic clutch 45 is connected), a part of the gas passed through the booster 44 flows back upstream of the booster 44 through the bypass passage 47. By controlling an opening of the air bypass valve 48, a backflow amount is adjusted, which leads to adjusting boost pressure of the gas introduced into the combustion chamber 17. In this embodiment, a boosting system 49 is constituted with the booster 44, the electromagnetic clutch 45, the bypass passage 47 and the air bypass valve 48.

An exhaust passage 50 is connected to a side of the engine 1 opposite from the intake passage 40. The exhaust passage 50 communicates with the exhaust ports 19 of the cylinders 11. The exhaust passage 50 is a passage through which exhaust gas discharged from the combustion chamber 17 flows. Although it is not illustrated in detail, an upstream part of the exhaust passage 50 constitutes independent passages branched for the respective cylinders 11. Upstream ends of the independent passages are connected to the exhaust ports 19 of the cylinders 11, respectively. An exhaust gas purification system having one or more catalyst converters 51 is disposed in the exhaust passage 50. The catalyst converters 51 include a three-way catalyst. Note that, the exhaust gas purification system is not limited to only include the three-way catalyst.

An EGR passage 52 constituting an external EGR system is connected between the intake passage 40 and the exhaust passage 50. The EGR passage 52 is a passage for recirculating a part of the exhaust gas to the intake passage 40. An upstream end of the EGR passage 52 is connected to the exhaust passage 50 upstream of the catalyst converters 51. A downstream end of the EGR passage 52 is connected to the intake passage 40 upstream of the surge tank 42.

A water-cooled type EGR cooler 53 is disposed in the EGR passage 52. The EGR cooler 53 cools the exhaust gas. An EGR valve 54 is also disposed in the EGR passage 52. The EGR valve 54 adjusts the flow rate of the exhaust gas flowing in the EGR passage 52. By adjusting an opening of the EGR valve 54, the recirculation amount of the cooled exhaust gas (i.e., external EGR gas) is adjusted.

In this embodiment, an external EGR system including the EGR passage 52 and the EGR valve 54, and an internal EGR system including the intake valve operating mechanism and the exhaust valve operating mechanism described above constitute an EGR system 55.

As illustrated in FIG. 2, the control device of the compression self-ignition engine includes the ECU (Engine Control Unit) 10 configured to operate the engine 1. The ECU 10 is a controller based on a well-known microcomputer and includes a CPU (Central Processing Unit) 101 configured to execute program(s), a memory 102 comprised of RAM(s) (Random Access Memory) and ROM(s) (Read Only Memory) and configured to store the program(s) and data, and an input/output bus 103 configured to input and output electric signals. The ECU 10 is one example of a "controller."

As illustrated in FIGS. 1 and 2, various sensors SW1 to SW16 are connected to the ECU 10. The sensors SW1 to SW16 output detection signals to the ECU 10. The sensors include the following sensors.

The sensors include an airflow sensor SW1 disposed in the intake passage 40 downstream of the air cleaner 41 and configured to detect a flow rate of fresh air flowing through the intake passage 40, a first intake air temperature sensor SW2 also disposed in the intake passage 40 downstream of the air cleaner 41 and configured to detect a temperature of the fresh air, a first pressure sensor SW3 disposed in the intake passage 40 upstream of the booster 44 and configured to detect pressure of the gas flowing into the booster 44, a second intake air temperature sensor SW4 disposed in the intake passage 40 downstream of the booster 44 and upstream of the downstream connecting position of the bypass passage 47 and configured to detect a temperature of the gas flowed out of the booster 44, a second pressure sensor SW5 attached to the surge tank 42 and configured to detect pressure of the gas therein, pressure sensors SW6 attached to the cylinder head 13 at positions corresponding to the cylinders 11 and configured to detect pressure in the combustion chambers 17, respectively, an exhaust temperature sensor SW7 disposed in the exhaust passage 50 and configured to detect a temperature of the exhaust gas discharged from the combustion chambers 17, a linear $O_2$ sensor SW8 disposed in the exhaust passage 50 upstream of the catalyst converters 51 and configured to detect an oxygen concentration within the exhaust gas, a lambda $O_2$ sensor SW9 disposed in the exhaust passage 50 downstream of the catalyst converter 51 and configured to detect an oxygen concentration within the exhaust gas, a water temperature sensor SW10 attached to the engine 1 and configured to detect a temperature of cooling water, a crank angle sensor SW11 attached to the engine 1 and configured to detect a rotational angle of the crankshaft 15, an accelerator opening sensor SW12 attached to an accelerator pedal mechanism and configured to detect an accelerator opening corresponding to an operation amount of an accelerator pedal, an intake cam angle sensor SW13 attached to the engine 1 and configured to detect a rotational angle of an intake camshaft, an exhaust cam angle sensor SW14 attached to the engine 1 and configured to detect a rotational angle of an exhaust camshaft, an EGR pressure difference sensor SW15 disposed in the EGR passage 52 and configured to detect a difference in pressure between positions upstream and downstream of the EGR valve 54, and a fuel pressure sensor SW16 attached to the common rail 64 of the fuel supply system 61 and configured to detect the pressure of the fuel supplied to the injectors 6.

Based on these detection signals, the ECU 10 determines the operating state of the engine 1 and calculates control amounts of various devices. The ECU 10 outputs control signals related to the calculated control amounts to the injectors 6, the spark plugs 25, the intake VVT 231, the intake CVVL 232, the exhaust VVT 241, the exhaust VVL 242, the fuel supply system 61, the throttle valve 43, the EGR valve 54, the electromagnetic clutch 45 of the booster 44, and the air bypass valve 48. For example, the ECU 10 adjusts the external EGR gas amount introduced into the combustion chambers 17 by controlling the opening of the EGR valve 54 based on the pressure difference between the upstream and downstream positions of the EGR valve 54 obtained from the detection signal of the EGR pressure difference sensor SW15. The control of the engine 1 by the ECU 10 is described later in detail.

(Operating Range of Engine)

Figure 3:
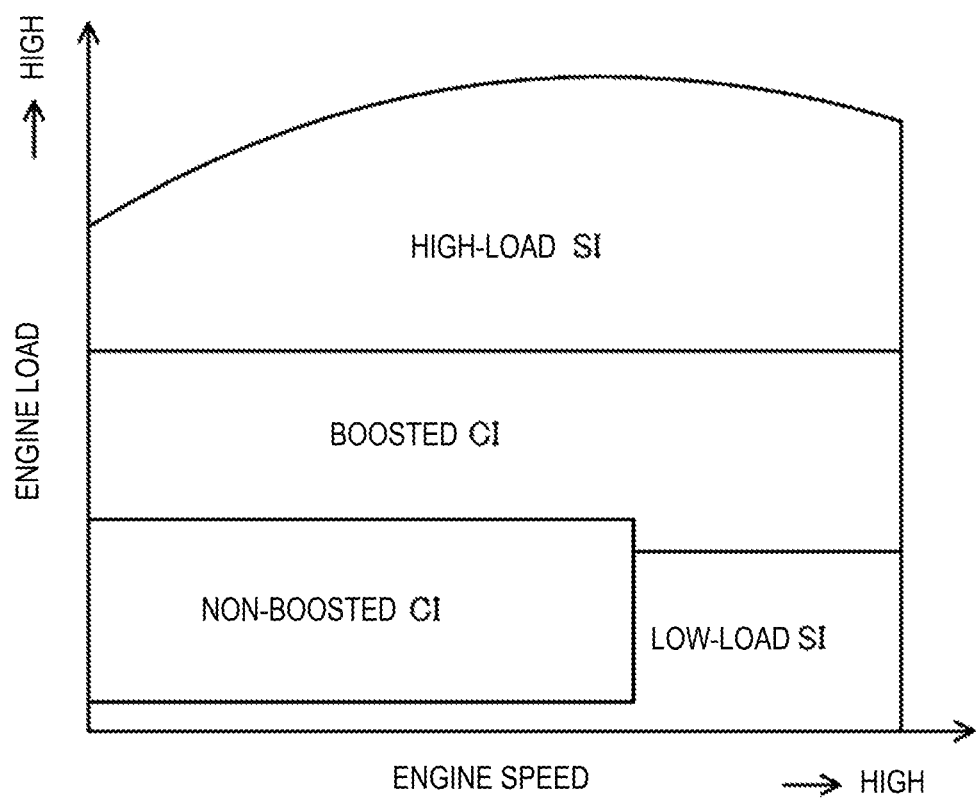
FIG. 3 is a chart illustrating an operating range of the engine.

FIG. 3 illustrates an operating range of the engine 1. The operating range of the engine 1 is roughly divided into four segments based on an engine load and an engine speed. For example, the four segments include a low-load SI range, a high-load SI range, a non-boosted CI range, and a boosted CI range. The low-load SI range includes a range where an engine load is low and which is near an idle operation range, and also a range where the engine load is low and an engine speed is high. In the high-load SI range, the engine load is high (including a full load). The non-boosted CI range is between the low-load SI range and the high-load SI range, and the engine load and the engine speed are relatively low therein. In the boosted CI range, the engine load is relatively high. Within the non-boosted CI range and the boosted CI range, the engine 1 performs combustion by compression self-ignition mainly to improve fuel efficiency and improve exhaust gas performance. Further, within the low-load SI range and the high-load SI range, the combustion is performed by spark ignition (SI). Hereinafter, the combustion modes within the low-load SI range, the non-boosted CI range, the boosted CI range, and the high-load SI range are sequentially described.

The combustion mode when the operating state of the engine 1 is within the low-load SI range is the SI combustion in which the mixture gas is combusted by flame propagation caused by spark ignition of the mixture gas in the combustion chamber 17 by the spark plug 25. Within the low-load SI range, an air-fuel ratio A/F of the mixture gas (i.e., a mass ratio between the fresh air and fuel within the combustion chamber 17) is substantially the theoretical air-fuel ratio (i.e., A/F=14.7). The three-way catalyst purifies the exhaust gas discharged from the combustion chamber 17. Thus, the exhaust gas performance of the engine 1 is improved. The A/F of the mixture gas may be set to remain within a purification window of the three-way catalyst (i.e., an air-fuel ratio width exhibiting the three-way purification function). Therefore, an excess air ratio λ of the mixture gas may be 1.0±0.2. Here, the booster 44 does not boost the intake air, and the opening of the throttle valve 43 is suitably adjusted. The internal EGR gas is not introduced into the combustion chamber 17.

When the operating state of the engine 1 is within the non-boosted CI range, the fuel injection amount is larger than that within the low-load SI range. Since the combustion temperature is high, by introducing the internal EGR gas into the combustion chamber 17, the temperature of the combustion chamber 17 increases and the self-ignition is performed stably. The engine 1 performs the CI combustion within the non-boosted CI range. Further, when the operating state of the engine 1 is within the non-boosted CI range, the intake air is not boosted while the internal EGR gas is introduced into the combustion chamber 17. The A/F of the mixture gas is set leaner than the theoretical air-fuel ratio.

When the engine load is increased and the fuel amount is further increased, if the engine is in the naturally aspirated state, the fresh air amount introduced into the combustion chamber 17 becomes insufficient. Therefore, when the operating state of the engine 1 is within the boosted CI range, the engine 1 performs the CI combustion while the booster 44 boosts the intake air introduced into the combustion chamber 17. Further, when the operating state of the engine 1 is within the boosted CI range, the internal EGR gas is introduced into the combustion chamber 17. The A/F of the mixture gas is set leaner than the theoretical air-fuel ratio. The boosted CI range may be referred to as "first range," and the non-boosted CI range where the engine load is lower than within the boosted CI range may be referred to as "second range."

When the engine load is high, the fuel injection amount is large. Therefore, when the CI combustion is performed, it becomes difficult to prevent combustion noise. Further, since the temperature in the combustion chamber 17 increases, performing the CI combustion easily causes abnormal combustion such as pre-ignition and knocking. Therefore, the combustion mode when the operating state of the engine 1 is within the high load range (i.e., within the high-load SI range) is the SI combustion. The A/F of the mixture gas is set to be substantially the theoretical air-fuel ratio. Further, when the operating state of the engine 1 is within the high-load SI range, the booster 44 performs the boost while the internal EGR gas is not introduced into the combustion chamber 17. The high-load SI range may be referred to as "third range" where the engine load is higher than that within the boosted CI range.

(Fuel Injection Control)

Figure 4:
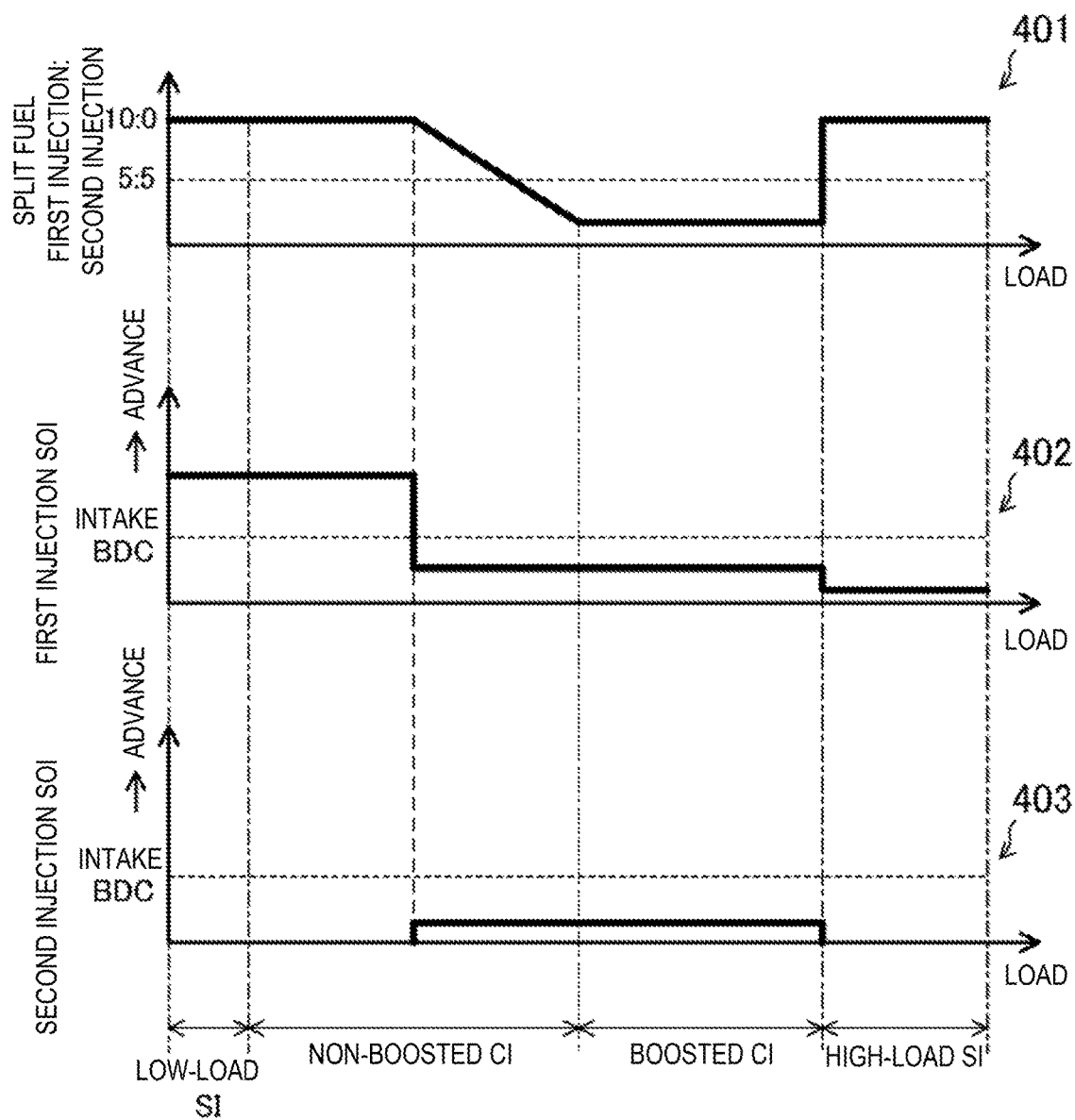
FIG. 4 shows charts illustrating changes in a fuel injection ratio of a first injection to a second injection, a start timing of the first injection, and a start timing of the second injection, with respect to an engine load.

FIG. 4 illustrates changes in the fuel injection mode at a given engine speed, with respect to the engine load. Hereinafter, the fuel injection modes of the four segments of the operating range are sequentially described.

(High-Load SI Range)

Although the engine 1 performs the SI combustion within the high-load SI range as described above, due to the geometric compression ratio being high, etc., the abnormal combustion such as pre-ignition and knocking easily occurs.

Therefore, the abnormal combustion is avoided in the engine 1 by devising the fuel injection mode within the high-load SI range. For example, the ECU 10 outputs control signals to the fuel supply system 61 and each injector 6 to inject the fuel into the combustion chamber 17 at fuel pressure of 30 MPa or higher, at a timing in a period from a late stage of the compression stroke until an early stage of expansion stroke (hereinafter, this period is referred to as the "retard period"). Therefore, as indicated in a graph 401, an injection ratio between a first injection and a second injection is 10:0; in other words, the injector 6 injects all the fuel for one combustion cycle at once. Further, as indicated in a graph 402, an injection start timing SOI of the first injection is in the late stage of the compression stroke.

The ECU 10 also outputs a control signal to each spark plug 25 to ignite the mixture gas at a timing near the CTDC after the fuel injection. Hereinafter, the fuel injection into the combustion chamber 17 at the high fuel pressure at the timing in the retard period is referred to as "high-pressure retard injection."

The high-pressure retard injection shortens reaction time of the mixture gas to avoid the abnormal combustion. That is, the reaction time of the mixture gas is a total length of time of (1) a period for which the injector 6 injects the fuel (i.e., injection period), (2) a period for which combustible mixture gas is formed around the spark plug 25 after the fuel injection (i.e., mixture gas formation period), and (3) a period from the start of ignition until the SI combustion ends (i.e., combustion period).

The injection period and the mixture gas formation period become shorter by injecting the fuel into the combustion chamber 17 at the high fuel pressure. By shortening the injection period and the mixture gas formation period, the timing of starting the fuel injection approaches the ignition timing. In the high-pressure retard injection, by increasing the fuel pressure, the fuel injection is performed at a timing in the retard period from the late stage of the compression stroke to the early stage of the expansion stroke.

A turbulence kinetic energy inside the combustion chamber 17 increases by injecting the fuel into the combustion chamber 17 at the high fuel pressure. By bringing the fuel injection timing close to the CTDC, the SI combustion is started in the state where the turbulence kinetic energy inside the combustion chamber 17 is high. As a result, the combustion period becomes short.

Thus, in the high-pressure retard injection, since the injection period, the mixture gas formation period, and the combustion period are respectively shortened, the reaction time of the mixture gas is significantly shortened compared with a case where the fuel is injected into the combustion chamber 17 on the intake stroke. As a result, the abnormal combustion is avoided.

By setting the fuel pressure to be, for example, 30 MPa or higher, the injection period, the mixture gas formation period, and the combustion period are effectively shortened. Note that, the fuel pressure may suitably be set according to properties of the fuel. An upper limit of the fuel pressure may be, for example, 120 MPa.

(Low-Load SI Range)

Within the low-load SI range, the ECU 10 outputs the control signal to the injector 6 to inject the fuel on the intake stroke. As indicated in the graph 401, the injector 6 injects all the fuel for one combustion cycle at once. Note that, the injector 6 may split the fuel and inject it in multiple injections. The fuel injected into the combustion chamber 17 on the intake stroke is spread by the intake air introduced into the combustion chamber 17. Thus, homogeneity of the mixture gas improves. As a result, unburned fuel loss is reduced, which improves the fuel efficiency of the engine 1. Further, production of smoke is avoided, which improves the exhaust gas performance.

(Non-Boosted CI Range)

The non-boosted CI range is divided into a first low engine load segment and a second low engine load segment. Within the first low engine load segment, similar to the low-load SI range, the injector 6 injects all the fuel for one combustion cycle on the intake stroke at once. On the other hand, within the second low engine load segment, the injector 6 performs split injections including the first injection and the second injection. As indicated in the graph 402, the injection start timing SOI of the first injection is in the early half of the compression stroke. As indicated in the graph 403, the injection start timing SOI of the second injection is in the late half of the compression stroke. Here, "the early half of the compression stroke" is the early half when the compression stroke period is divided in half and "the late half of the compression stroke" is the late half thereof.

As indicated in the graph 401, an injection ratio between the first and second injections changes such that the injection amount of the second injection increases and the injection amount of the first injection decreases as the engine load increases. The injection amount of the second injection becomes larger than the injection amount of the first injection at a given load.

Within the non-boosted CI range, the ECU 10 outputs the control signal to the injector 6 to inject a given amount of the fuel at a given timing according to the engine load.

(Boosted CI Range)

Within the boosted CI range, the injector 6 performs split injections including the first injection and the second injection regardless of the engine load. As indicated in the graph 402, the injection start timing SOI of the first injection is in the early half of the compression stroke. As indicated in the graph 403, the injection start timing SOI of the second injection is in the late half of the compression stroke. The ratio between the injection amounts of the first and second injections is constant. The injection amount of the second injection is larger than that of the first injection.

Within the boosted CI range, the ECU 10 outputs the control signal to the injector 6 to perform two fuel injections of the first and second injections on the compression stroke.

(Operation of Intake Valve and Exhaust Valve)

Next, a change in operations of the intake valve 21 and the exhaust valve 22 with respect to the engine load is described.

Figure 5:
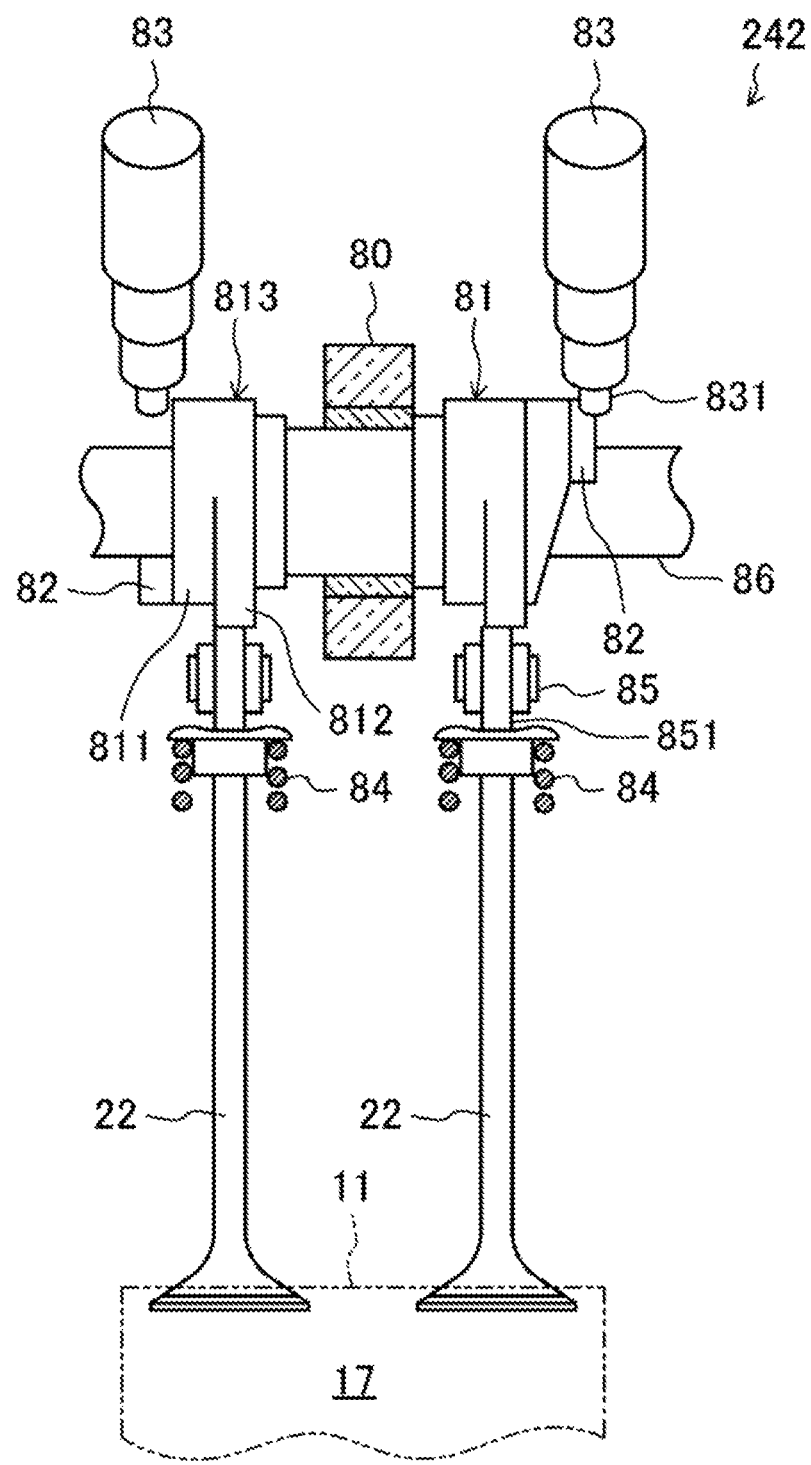
FIG. 5 is a view illustrating a structure of a valve operating mechanism of an exhaust valve.

First, the structure of the exhaust VVL 242 is described in detail with reference to FIG. 5. FIG. 5 illustrates only a specific cylinder 11 of the engine 1. For each cylinder 11, the cylinder head 13 of the engine 1 is provided with two exhaust valves 22 and two return springs 84 configured to bias the exhaust valves 22 in a valve closing direction. Further, an exhaust camshaft 86 configured to open each exhaust valve 22 against the biasing force of the return spring 84 via a rocker arm 85 is provided in an upper part of the cylinder head 13. The camshaft 86 is rotatably supported by a bearing 80 provided in the cylinder head 13. The camshaft 86 is rotationally driven by the crankshaft 15 (not illustrated in FIG. 5) via a chain.

Cylindrical cam elements 81 are spline-fitted to the camshaft 86. The cam elements 81 are coupled to the camshaft 86 to integrally rotate therewith in a rotating direction of the camshaft 86, and fitted thereto to be slidable in axial directions of the camshaft 86. Although it is not illustrated in the drawing, the cam elements 81 are arranged on the camshaft 86 to be axially in line so as to correspond to the respective cylinders 11. Each cam element 81 includes the first cam part 811 and the second cam part 812 configured to open and close the exhaust valve 22 by coming slidably in contact with a cam follower 851 of the rocker arm 85. The first cam part 811 may be referred to as "first cam" and the second cam part may be referred as "second cam." In correspondence to the two exhaust valves 22 being provided for each cylinder 11, two first cam parts 811 and two second cam parts 812 are provided for each cylinder 11. In other words, each cam element 81 includes the two first cam parts 811 and two second cam parts 812.

The first cam part 811 is provided adjacent to the second cam part 812. As described later, the first cam part 811 is a cam selected within the low-load SI range, the boosted CI range, and the high-load SI range, and the second cam part 812 is a cam selected within the non-boosted CI range.

The first and second cam parts 811 and 812 have a common base circle 813 and nose portions. The nose portions have different lifts from each other and are provided on the base circle 813 with a phase difference. Note that, having the common base circle 813 means that the first and second cam parts 811 and 812 have the same base diameter at the base circle 813.

Each cam element 81 is provided with end face cams 82 in both end parts in the axial directions, respectively. Each end face cam 82 is formed so that it protrudes from a reference surface in one of the axial directions, the amount of the protrusion gradually increases in the rotation direction and then returns back to the reference surface at a protrusion end position.

Electromagnetic actuators 83 are disposed above the cam element 81 at positions corresponding to the end face cams 82 on the both sides in the axial directions. Each electromagnetic actuator 83 has a pin part 831 protruding toward the camshaft 86 when energized. According to a control signal from the ECU 10, when the electromagnetic actuator 83 is not energized, the pin part 831 is held at an upper position (non-operating position) by a permanent magnet provided inside the actuator. On the other hand, when the electromagnetic actuator 83 is energized, the pin part 831 protrudes downward against the permanent magnet and advances to an operating position.

When the pin part 831 of the electromagnetic actuator 83 advances to the operating position, a tip portion of the pin part 831 comes slidably into contact with the corresponding end face cam 82, and the cam element 81 is slid in one of the axial directions.

For example, when the electromagnetic actuator 83 on one end side of the cam element 81 (that is, on the right side in FIG. 5) is operated to bring the pin part 831 into slidable contact with the end face cam 82 on the end side of the cam element 81, the cam element 81 slides to the other axial end side (that is, to the left side in FIG. 5) so that the second cam parts 812 shift to slidably contact with the cam followers 851 of the rocker arms 85. When the electromagnetic actuator 83 on the other end side of the cam element 81 is operated to bring the pin part 831 into slidable contact with the end face cam 82 on the other end side of the cam element 81, the cam element 81 slides to the axial end side so that the first cam parts 811 shift to slidably contact with the cam followers 851 of the rocker arms 85. Thus, by shifting the cam element 81 in the axial directions, the cam parts configured to open and close the exhaust valves 22 are switched between the first cam parts 811 and the second cam parts 812. The end face cams 82 and the electromagnetic actuators 83 constitute a switch mechanism configured to switch the operating cam parts between the first and second cam parts 811 and 812.

Figure 6:
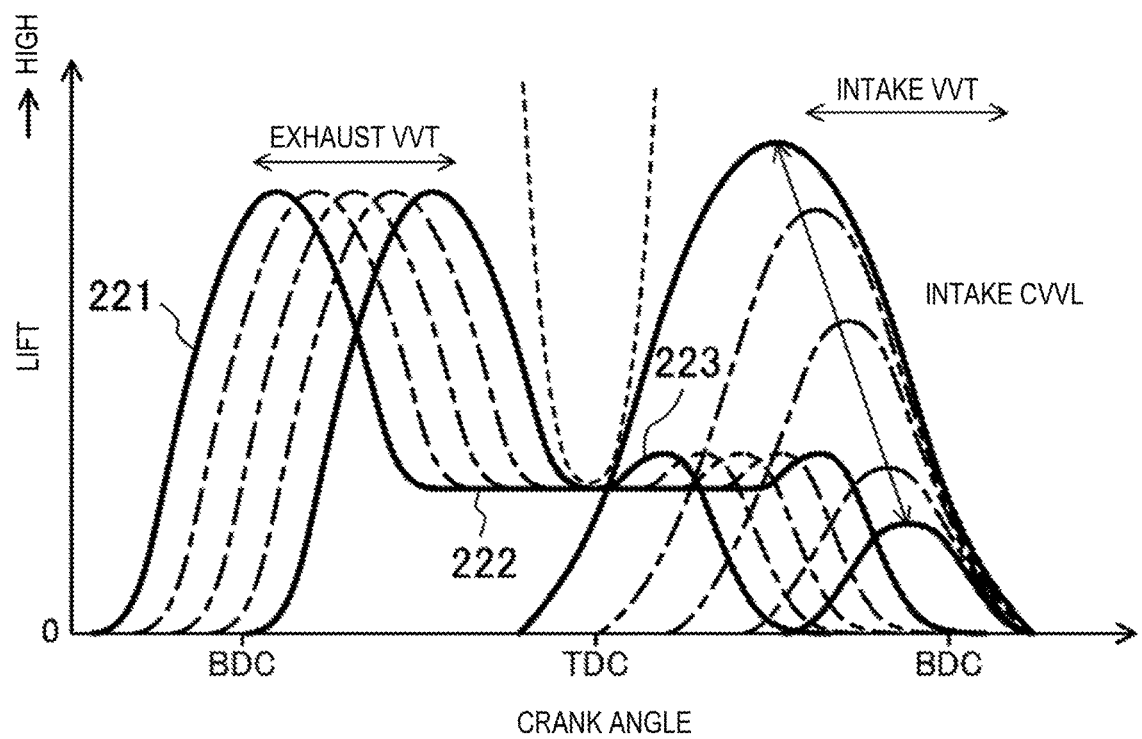
FIG. 6 is a chart illustrating a change in operating timings of the exhaust valve, and a change in a lift of an intake valve.

Next, the opening operations of the intake and the exhaust valves 21 and 22 are described with reference to FIG. 6. The lift of each intake valve 21 continuously varies by the intake CVVL 232 from a lowest lift to a highest lift as illustrated in FIG. 6. Here, the intake CVVL 232 changes the lift of the intake valve 21 while keeping the close timing of the intake valve 21 constant. Therefore, as the highest lift of the intake valve 21 becomes higher, the open timing of the intake valve 21 advances. Further, although it is not illustrated in FIG. 6, the operating timing of the intake valve 21 is changed within a given range by the intake VVT 231.

Although it is not illustrated in FIG. 6, similar to the cam profile of the intake valve 21, the first cam part 811 of the exhaust VVL 242 has a cam profile in which a single cam nose is provided such that the lift of the exhaust valve 22 gradually increases from zero to the highest lift, and then gradually decreases to zero as the crank angle progresses.

On the other hand, the second cam part 812 of the exhaust VVL 242, as illustrated in FIG. 6, has a cam profile in which a flat protruding portion 222 configured to keep the lift of the exhaust valve 22 substantially constant while the crank angle progresses is provided at the closing side of the lift curve. For example, the cam profile of the second cam part 812 includes a large protruding portion 221, the flat protruding portion 222, and a small protruding portion 223. The large protruding portion 221 is a portion where the lift of the exhaust valve 22 gradually increases from zero to the highest lift, and then gradually decreases as the crank angle progresses. The large protruding portion 221 corresponds to a first cam nose configured to open the exhaust valve 22 on the exhaust stroke. The flat protruding portion 222 is a portion continuing from the large protruding portion 221 and leading into the intake stroke while keeping the lift of the exhaust valve 22 substantially constant. The small protruding portion 223 is a portion continuing from the flat protruding portion 222 and where the lift of the exhaust valve 22 increases from that in the flat protruding portion 222 once and then gradually decreases to zero. The flat protruding portion 222 and the small protruding portion 223 correspond to a second cam nose continuing from the first cam nose and where the exhaust valve 22 is kept opened from the exhaust stroke to the intake strike.

Here, the dashed line of FIG. 6 indicates a dimension of a gap between the disposed position of the exhaust valve 22 and the ceiling surface of the combustion chamber 17, and the lift of the flat protruding portion 222 is set to the highest possible lift within a range where the exhaust valve 22 does not interfere with a top surface of the piston 3. Further, by providing the small protruding portion 223, the amount of the exhaust valve 22 opened on the intake stroke (i.e., an area formed by the lift curve of the exhaust valve 22 illustrated in FIG. 6 in the intake stroke period). When the amount of the exhaust valve 22 opened on the intake stroke is increased, the introduction amount of the internal EGR gas into the combustion chamber 17 increases. Note that, the lift of the flat protruding portion 222 may be lower than the highest lift described above. Further, the small protruding portion 223 may be omitted. Moreover, the second cam part 812 of the exhaust valve 22 may adopt a cam profile in which the valve is opened on the exhaust stroke, closed once, and then opened again on the intake stroke, instead of the cam profile in which the valve is opened on the exhaust stroke, kept opened over the flat protruding portion 222, and then closed on the intake stroke.

The operating timing of the exhaust valve 22 is changed by the exhaust VVT 241 within a given range as indicated by an arrow of FIG. 6.

Figure 7:
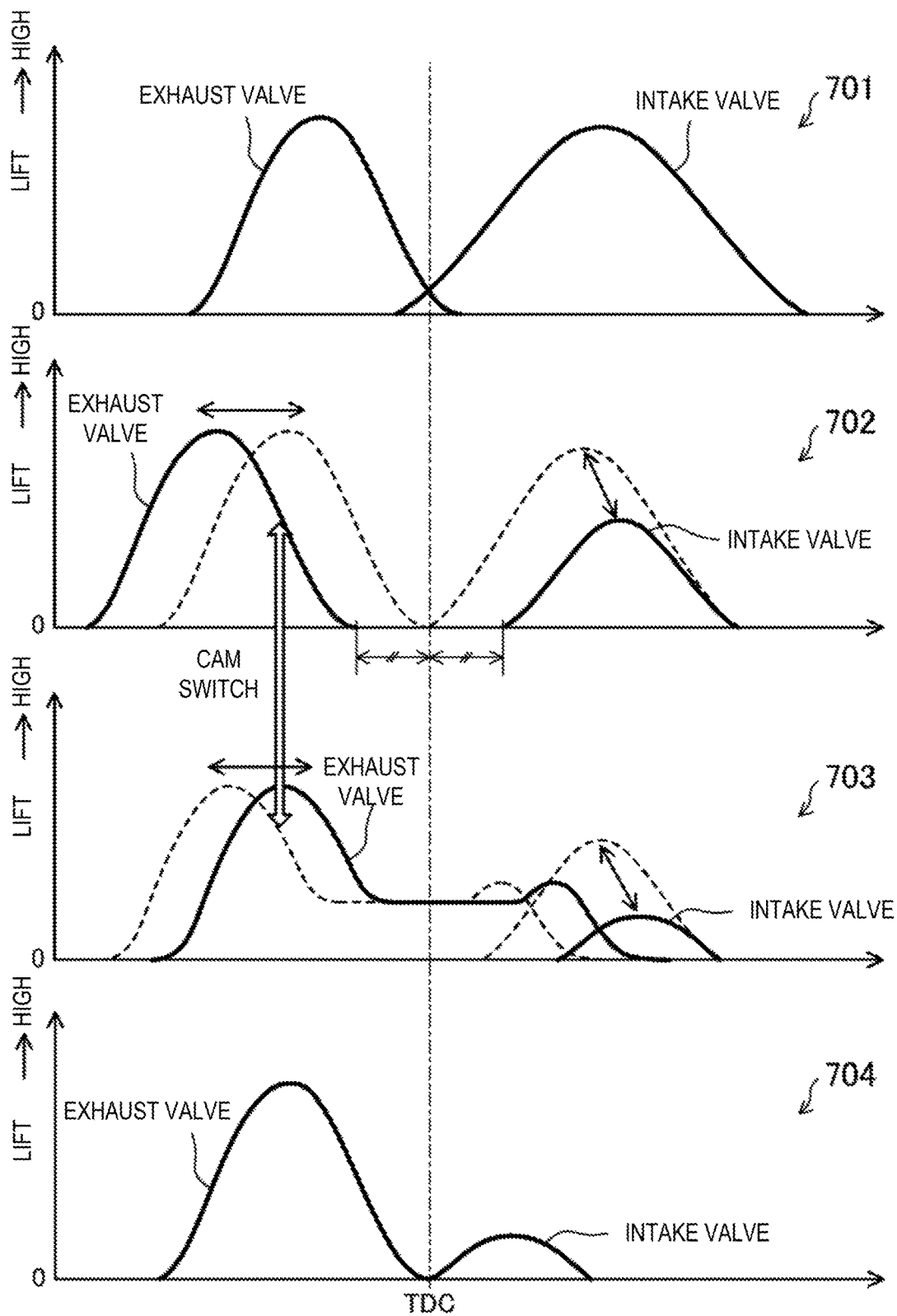
FIG. 7 shows charts illustrating relationships of the valve lift between the intake valve and the exhaust valve in respective operating ranges.

FIG. 7 shows charts illustrating relationships between the intake valve 21 and the exhaust valve 22 in the respective segments of the operating range. First, a graph 701 indicates one example of a relationship between the lifts of the intake valve 21 and the exhaust valve 22 when the engine 1 operates within the high-load SI range. The intake CVVL 232 sets the lift of the intake valve 21 to be high. Further, the open and close timings of the intake valve 21 are suitably adjusted by the intake VVT 231 according to the operating state of the engine 1. The exhaust valve 22 is opened by the first cam part 811 of the exhaust VVL 242. The exhaust valve 22 is opened on the exhaust stroke and closed near a top dead center of the exhaust stroke. The open and close timings of the exhaust valve 22 are set to suitable timings by the exhaust VVT 241. When the engine 1 operates within the high-load SI range, the intake and exhaust valves 21 and 22 are both opened around the top dead center of the exhaust stroke; in other words, the variable valve operating system operates in a third mode within the high-load SI range. The combination of providing the positive overlap period of the intake and exhaust valves 21 and 22 and performing the boost by the booster 44 facilitates scavenging of the exhaust gas. When the engine 1 operates within the high-load SI range, the internal EGR gas amount introduced into the combustion chamber 17 becomes substantially zero, which is advantageous in avoiding the abnormal combustion within the high-load SI range.

A graph 704 indicates one example of a relationship between the lifts of the intake valve 21 and the exhaust valve 22 when the engine 1 operates within the low-load SI range. The intake CVVL 232 sets the lift of the intake valve 21 to be low. Further, the open and close timings of the intake valve 21 are suitably adjusted by the intake VVT 231 according to the operating state of the engine 1. The exhaust valve 22 is opened by the first cam part 811 of the exhaust VVL 242. The open and close timings of the exhaust valve 22 are set to suitable timings by the exhaust VVT 241. Also, when the engine 1 operates within the low-load SI range, the internal EGR gas amount introduced into the combustion chamber 17 becomes substantially zero.

A graph 703 indicates one example of a relationship between the lifts of the intake valve 21 and the exhaust valve 22 when the engine 1 operates within the non-boosted CI range. The exhaust valve 22 is opened by the second cam part 812 of the exhaust VVL 242. Thus, the close timing of the exhaust valve 22 is in the intake stroke period. Further, the open and close timings of the exhaust valve 22 are adjusted by the exhaust VVT 241 according to the engine load as described later. Further as described later, the intake valve 21 is set to have a given high lift by the intake CVVL 232. The close timing of the intake valve 21 is set to a given timing by the intake VVT 231, while the open timing thereof is set according to the lift. By opening the exhaust valve 22 on the intake stroke, the exhaust gas which is discharged to the exhaust port 19 on the exhaust stroke is re-introduced into the combustion chamber 17 by a given amount; in other words, the variable valve operating system operates in a second mode within the non-boosted CI range.

A graph 702 indicates one example of a relationship between the lifts of the intake valve 21 and the exhaust valve 22 when the engine 1 operates within the boosted CI range. The exhaust valve 22 is opened by the first cam part 811 of the exhaust VVL 242. Further, the open and close timings of the exhaust valve 22 are adjusted by the exhaust VVT 241 according to the engine load as described later. The close timing of the exhaust valve 22 is set to be before the top dead center of the exhaust stroke. As described later, the lift of the intake valve 21 is changed by the intake CVVL 232 according to the engine load. The close timing of the intake valve 21 is set to a given timing by the intake VVT 231, while the open timing thereof is set according to the lift. The exhaust and intake valves 22 and 21 are both closed around the top dead center of the exhaust stroke. By providing the negative overlap period of the exhaust and intake valves 22 and 21, a part of the exhaust gas is confined inside the combustion chamber 17 by a given amount; in other words, the variable valve operating systems operate in a first mode within the boosted CI range.

Next, a control of the variable valve operating systems of the intake and the exhaust valves 21 and 22 and a control of the boosting system 49 with respect to the engine load are described with reference to FIGS. 8 and 9. Hereinafter, the control of the variable valve operating systems and the boosting system 49 in each range is described assuming that the engine load gradually increases from a low state to a high state. Note that, description for a case where the engine load gradually changes from the high state to the low state becomes opposite to the following description.

Figure 8:
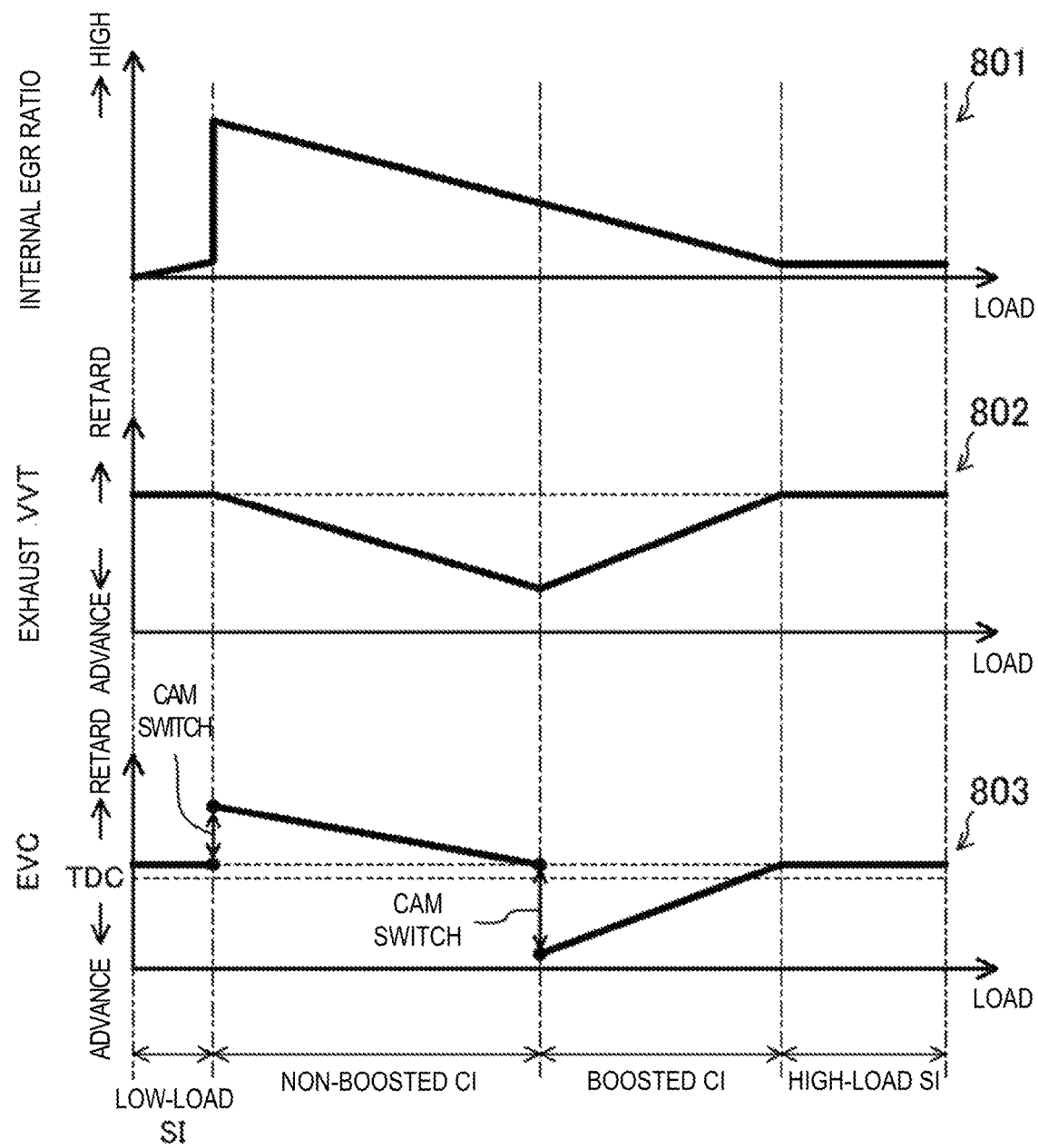
FIG. 8 shows charts illustrating changes in an internal EGR ratio, an operating timing of the exhaust valve, and a close timing of the exhaust valve, with respect to the engine load.

First, a graph 801 of FIG. 8 indicates a change in the internal EGR ratio with respect to the engine load when the engine speed is a given value. Within the low-load SI range where the engine load is low, as described above, the internal EGR gas amount introduced into the combustion chamber 17 is substantially zero. Therefore, the internal EGR ratio is also substantially zero. In this case, the exhaust valve 22 is opened by the first cam part 811. As indicated by a graph 802, the exhaust VVT 241 retards the operating timing of the exhaust valve 22. Thus, the close timing of the exhaust valve 22 (EVC) is set near the top dead center of the exhaust stroke as indicated by a graph 803.

Figure 9:
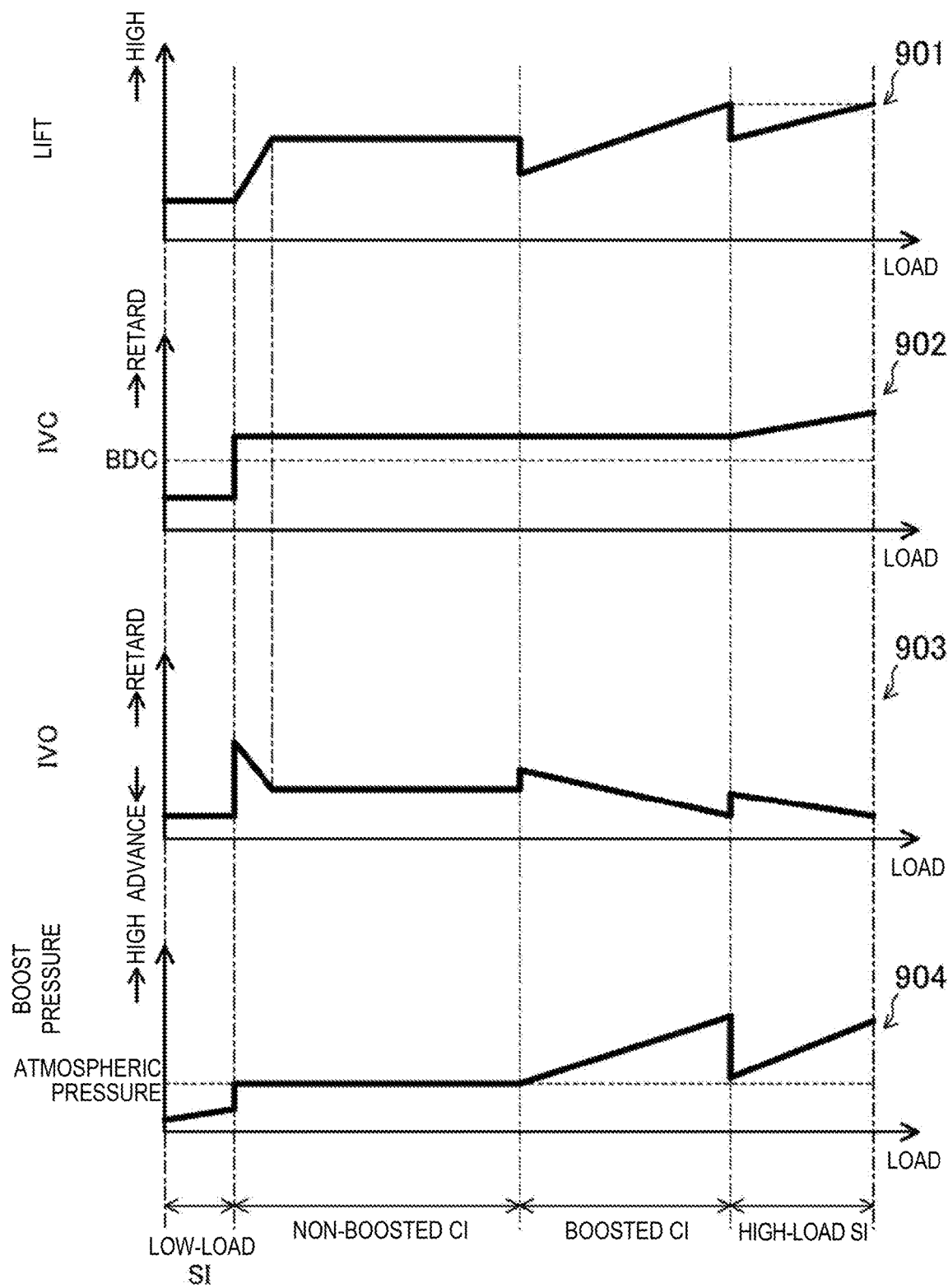
FIG. 9 shows charts illustrating changes in the lift of the intake valve, a close timing of the intake valve, an open timing of the intake valve, and boost pressure, with respect to the engine load.

The intake CVVL 232 sets the intake valve 21 to have a given low lift as indicated by a graph 901 of FIG. 9. The intake VVT 231 sets the close timing of the intake valve 21 (IVC) to before the bottom dead center of the intake stroke as indicated by a graph 902. The open timing of the intake valve 21 (IVO) is accordingly set to a given timing as indicated by a graph 903.

Within the low-load SI range, the boosting system 49 does not boost the intake air (see a graph 904). Further, the ECU 10 adjusts the throttle valve 43 to a suitable opening and adjusts the fresh air amount introduced into the combustion chamber 17, so that the boost pressure (i.e., intake pressure) becomes lower than atmospheric pressure.

Within the non-boosted CI range where the engine load becomes higher than the low-load SI range, as indicated by the graph 801, a relatively large amount of internal EGR gas is introduced into the combustion chamber 17. As indicated by the graph 803, the exhaust VVL 242 switches the operating cam part between the first cam part 811 and the second cam part 812 at a boundary between the low-load SI range and the non-boosted CI range. In other words, when the operating state of the engine 1 shifts from the low-load SI range to the non-boosted CI range, the exhaust VVL 242 switches the operating cam part from the first cam part 811 to the second cam part 812. As indicated by the graph 803, the close timing of the exhaust valve 22 is instantly retarded from near the top dead center of the exhaust stroke to the intake stroke period (also see the solid line of the graph 703 of FIG. 7). Thus, a large amount of the internal EGR gas is introduced into the combustion chamber 17. When the variable valve operating system operates in the second mode, the internal EGR ratio is increased compared to when operating in the first mode. Within the non-boosted CI range, although the temperature of the internal EGR gas becomes relatively low since the engine load is relatively low, by operating the variable valve operating system in the second mode, a large amount of internal EGR gas is introduced into the combustion chamber 17. Therefore, the temperature inside the combustion chamber 17 is increased to a desirable temperature. As a result, within the non-boosted CI range, the CI combustion is stabilized.

As indicated by the graph 802, within the non-boosted CI range, the exhaust VVT 241 gradually advances the operating timing of the exhaust valve 22 as the engine load increases. Thus, as illustrated in the graph 803, the close timing of the exhaust valve 22 is gradually advanced toward the top dead center of the exhaust stroke in the intake stroke period. Since the opening of the exhaust valve 22 in the intake stroke period decreases (see the dashed line in the graph 703), the amount of the internal EGR gas introduced into the combustion chamber 17 gradually decreases. Therefore, as indicated by the graph 801, within the non-boosted CI range, the internal EGR ratio gradually decreases as the engine load increases. As the engine load increases, the fuel amount increases and the temperature inside the combustion chamber 17 rises. Thus, even when the amount of the internal EGR gas is reduced, the mixture gas is stably combusted by self-ignition. Further, within the non-boosted CI range where the boost of the intake air is not performed, since the fresh air amount is increased by the reduced amount of the internal EGR gas, the fresh air sufficient for the fuel amount is secured.

Figure 10:
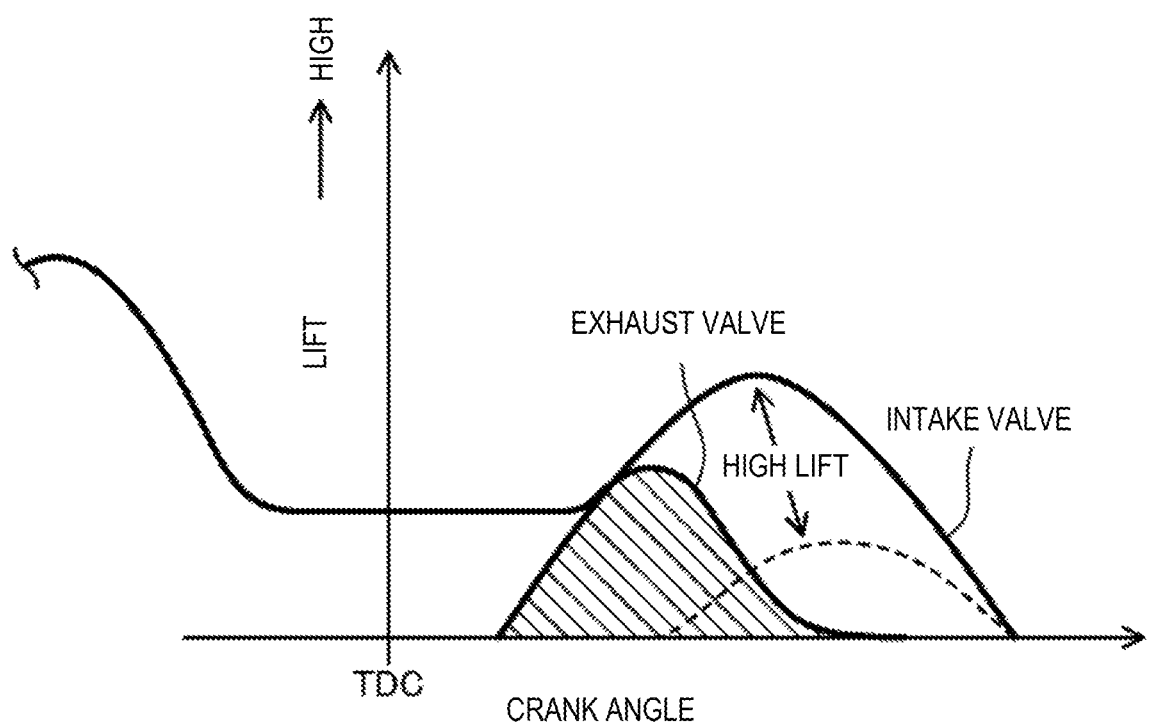
FIG. 10 is a chart illustrating a lift state of the exhaust valve and a lift state of the intake valve within a non-boosted CI range.

The intake VVT 231 retards the operating timing of the intake valve 21 within the non-boosted CI range. As indicated by the graph 901, the intake valve 21 is set to have a given high lift within the non-boosted CI range. In this manner, as illustrated in FIG. 10, a sum of the openings of the intake valve 21 and the exhaust valve 22 in the intake stroke period becomes large, and therefore, a pump loss of the engine 1 is reduced. The given high lift may be, for example, higher than the lowest lift and lower than the highest lift. Since the intake CVVL 232 changes the lift without changing the IVC, the IVC is fixed within the non-boosted CI range as indicated by the graph 902, and the IVO is advanced as the lift increases as indicated by the graph 903.

Note that, within the non-boosted CI range, the boosting system 49 does not perform the boost of the intake air (see the graph 904). Further, the ECU 10 fully opens the throttle valve 43. Thus, the boost pressure becomes equal to the atmospheric pressure.

Within the boosted CI range where the engine load is further increased, as indicated by the graph 801, the internal EGR ratio gradually decreases as the engine load increases. The internal EGR ratio changes continuously over the boundary between the non-boosted CI range and the boosted CI range. Therefore, the internal EGR ratio continuously decreases as the engine load increases over the entire non-boosted CI range and the entire boosted CI range. As indicated by the graph 801, from the non-boosted CI range to the boosted CI range, the internal EGR ratio decreases linearly as the engine load increases.

As described above, within the non-boosted CI range, the exhaust VVL 242 opens the exhaust valve 22 with the second cam part 812, and within the boosted CI range, the exhaust VVL 242 opens the exhaust valve 22 with the first cam part 811 (see the graph 803). At a timing that the operating state of the engine 1 shifts from the non-boosted CI range to the boosted CI range, the ECU 10 controls the exhaust VVL 242 to switch the operating cam part from the second cam part 812 to the first cam part 811. Here, it is required to prevent the internal EGR ratio from changing sharply before and after the switch of the cam part.

Although it is not illustrated in detail, the switch of the cam part between the first and second cam parts 811 and 812 is performed at a timing when the first and second cam parts 811 and 812 form no step. For example, as indicated by a white arrow in FIG. 7, the switch is performed at a timing when the lift of the exhaust valve 22 is even in the first and second cam parts 811 and 812, which is on the closing side after reaching the highest lift.

When the exhaust VVL 242 performs the switch from the second cam part 812 to the first cam part 811 while the operating timing of the exhaust valve 22 is at a given advanced position indicated by the dashed line of the graph 703 of FIG. 7, the lift curve of the exhaust valve 22 instantly switches as indicated by the solid line of the graph 702. Thus, the close timing of the exhaust valve 22 instantly changes from the intake stroke period into the exhaust stroke period. The mode of the variable valve operating system switches from the second mode in which the exhaust valve 22 is opened on the intake stroke to introduce the internal EGR gas into the combustion chamber 17, to the first mode in which the exhaust valve 22 is closed before the top dead center of the exhaust stroke to confine the internal EGR gas in the combustion chamber 17. Although the manner of introducing the internal EGR gas into the combustion chamber changes, the state where the internal EGR gas is introduced into the combustion chamber continues.

At the timing of shifting from the non-boosted CI range to the boosted CI range, the intake CVVL 23 reduces the lift of the intake valve 21 from the high lift to a given lift as indicated by the graph 901. Thus, as indicated by the graph 903, the open timing of the intake valve 21 is retarded. In this manner, as indicated by the graph 702 of FIG. 7, the period from the close timing of the exhaust valve 22 to the top dead center of the exhaust stroke and the period from the top dead center of the exhaust stroke to the open timing of the intake valve 21 become even. When the negative overlap period of the intake valve 21 and the exhaust valve 22 is provided, the pump loss is reduced.

Further, the boosting system 49 performs the boost within the boosted CI range. For example, the ECU 10 connects the electromagnetic clutch 45 to start the boost by the booster 44. As indicated by the graph 904, the boost pressure gradually increases as the engine load increases. The boost pressure is adjusted by the ECU 10 controlling the opening of the air bypass valve 48.

If the exhaust VVL 242 operates in the second mode within the boosted CI range, when the exhaust valve 22 and the intake valve 21 are both opened on the intake stroke, blow-by of the intake air from the intake side to the exhaust side of the engine 1 through the combustion chamber 17 occurs. Thus, it becomes difficult to accurately adjust the amount of the internal EGR gas introduced into the combustion chamber 17. In other words, the controllability of the internal EGR ratio degrades.

On the other hand, within the boosted CI range, by operating the exhaust VVL 242 in the first mode, the exhaust valve 22 and the intake valve 21 do not open simultaneously on the intake stroke, and therefore, the blow-by of the intake air described above is prevented. Thus, the controllability of the internal EGR ratio improves.

Although it becomes difficult to introduce a large amount of internal EGR gas into the combustion chamber 17 when the exhaust VVL 242 operates in the first mode, since the engine load is relatively high within the boosted CI range, the temperature inside the combustion chamber 17 required for stabilizing the CI combustion is relatively low. Further, within the boosted CI range, the fuel amount is relatively large, and the temperature of the internal EGR gas becomes relatively high. Therefore, even when the amount of internal EGR gas introduced into the combustion chamber 17 is small, the temperature inside the combustion chamber 17 is increased to a desired temperature.

Within the boosted CI range, as indicated by the graph 802, the exhaust VVT 241 gradually retards the operating timing of the exhaust valve 22 as the engine load increases. Thus, as indicated by the graph 803, the close timing of the exhaust valve 22 approaches the top dead center of the exhaust stroke, which shortens the negative overlap period and gradually reduces the internal EGR ratio.

Within the boosted CI range, as indicated by the graph 901, the intake CVVL 232 increases the lift of the intake valve 21 gradually as the engine load increases. Thus, while the close timing of the intake valve 21 remains constant as indicated by the graph 902, the open timing of the intake valve 21 gradually advances as indicated by the graph 903 (also see the arrow of the graph 702 of FIG. 7).

Figure 11:
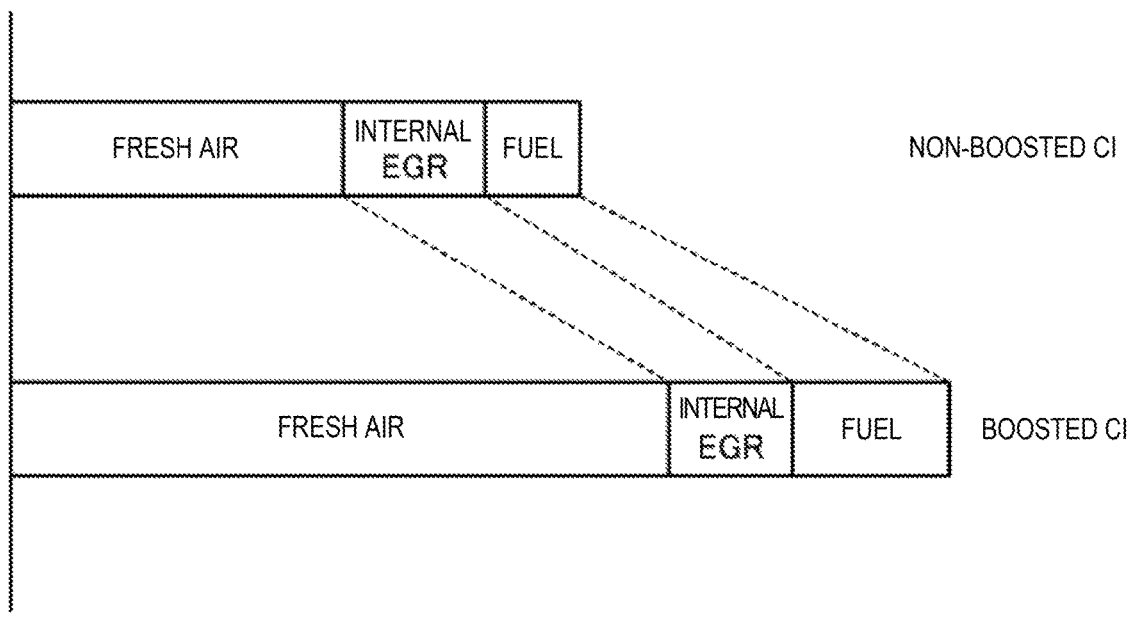
FIG. 11 is a diagram illustrating gas composition within the combustion chamber within the non-boosted CI range and a boosted CI range.

As a result, the fresh air amount introduced into the combustion chamber 17 is increased corresponding to the increase of the fuel amount. FIG. 11 shows a comparison between one example of gas composition inside the combustion chamber 17 within the non-boosted CI range and another example of gas composition inside the combustion chamber 17 within the boosted CI range. In each of the non-boosted CI range and the boosted CI range, the G/F of the mixture gas (i.e., a mass ratio between the entire gas and the fuel within the combustion chamber 17) is maintained as constant, whereas the A/F of the mixture gas is increased as the engine load increases. Note that, as described above, in the non-boosted CI range and the boosted CI range, the A/F of the mixture gas is leaner than the theoretical air-fuel ratio (i.e., the excess air ratio λ of the mixture gas exceeds 1).

Within the high-load SI range, as described above, the internal EGR ratio is set to substantially zero (see the graph 801). As indicated by the graph 802, the exhaust VVT 241 sets the operating timing of the exhaust VVT 241 to the most retarded timing, and thus, the close timing of the exhaust valve 22 reaches the retarding side of the top dead center of the exhaust stroke (i.e., on the intake stroke) as indicated by the graph 803. Within the high-load SI range, the exhaust VVT 241 fixes the operating timing of the exhaust valve 22 regardless of the engine load (see the graphs 802 and 803).

Within the high-load SI range, the A/F of the mixture gas becomes substantially equal to the theoretical air-fuel ratio. The fresh air amount introduced into the combustion chamber 17 is required to be reduced at the timing of shifting from the boosted CI range where the A/F is leaner than the theoretical air-fuel ratio, to the high-load SI range. As indicated by the graph 901, the intake CVVL 232 reduces the lift of the intake valve 21 once. Accordingly, the open timing of the intake valve 21 is retarded once as indicated by the graph 903. Within the high-load SI range, the intake CVVL 232 gradually increases the lift of the intake valve 21 as the engine load increases. Accordingly, the open timing of the intake valve 21 gradually advances as the engine load increases.

Further, as indicated by the graph 902, the intake VVT 231 gradually retards the close timing of the intake valve 21 as the engine load increases within the high-load SI range. The intake valve 21 is closed at a retarded timing which is on the compression stroke, and the retarded amount gradually increases.

Further, at the timing when the operating state of the engine 1 shifts from the boosted CI range to the high-load SI range, the boosting system 49 reduces the boost pressure once so as to adjust the fresh air amount (see the graph 904). The boosting system 49 gradually increases the boost pressure as the engine load increases within the high-load SI range.

By increasing the retarded amount of the intake valve 21 as the engine load increases, knocking is avoided. On the other hand, since the boost pressure needs to be increased by the retarded amount of the intake valve 21, the work of the booster 44 becomes a loss.

Figure 12:
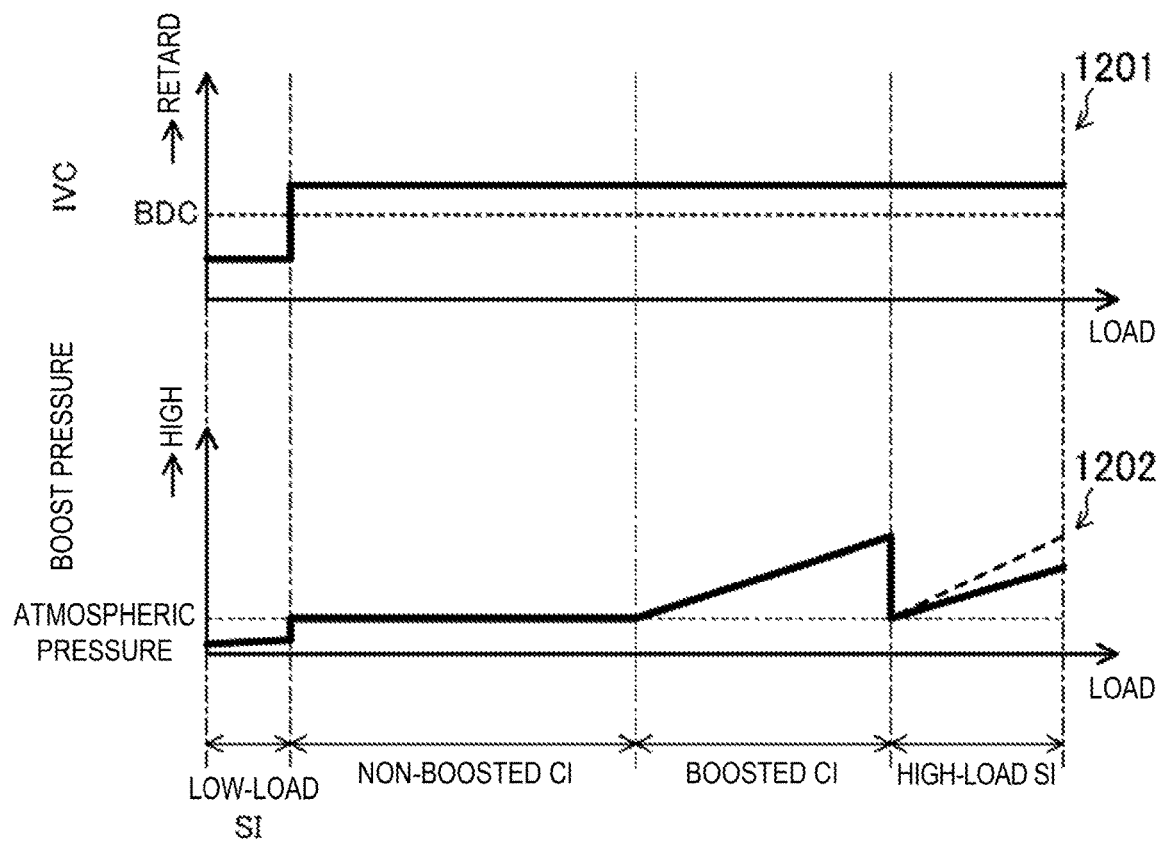
FIG. 12 shows charts illustrating changes in the close timing of the intake valve and the boost pressure, with respect to the engine load.

Here, in one modification, as indicated by a graph 1201 of FIG. 12, the intake VVT 231 may maintain the close timing of the intake valve 21 constant within the high-load SI range. In this case, the ignition timing may need to be retarded to avoid knocking, while, as indicated by a graph 1202, the boosting system 49 sets the boost pressure relatively low. Note that, the dashed line of the graph 1202 corresponds to the solid line of the graph 904 of FIG. 9.

The setting of the close timing of the intake valve 21 by the intake VVT 231 may be to one of the graph 902 of FIG. 9 and the graph 1201 of FIG. 12 suitably according to the efficiency of the booster 44. Further, one of the graph 902 and the graph 1201 may be selected according to the engine speed.

(Cam Switch Control at Boundary Between Non-Boosted CI Range and Boosted CI Range)

Figure 13:
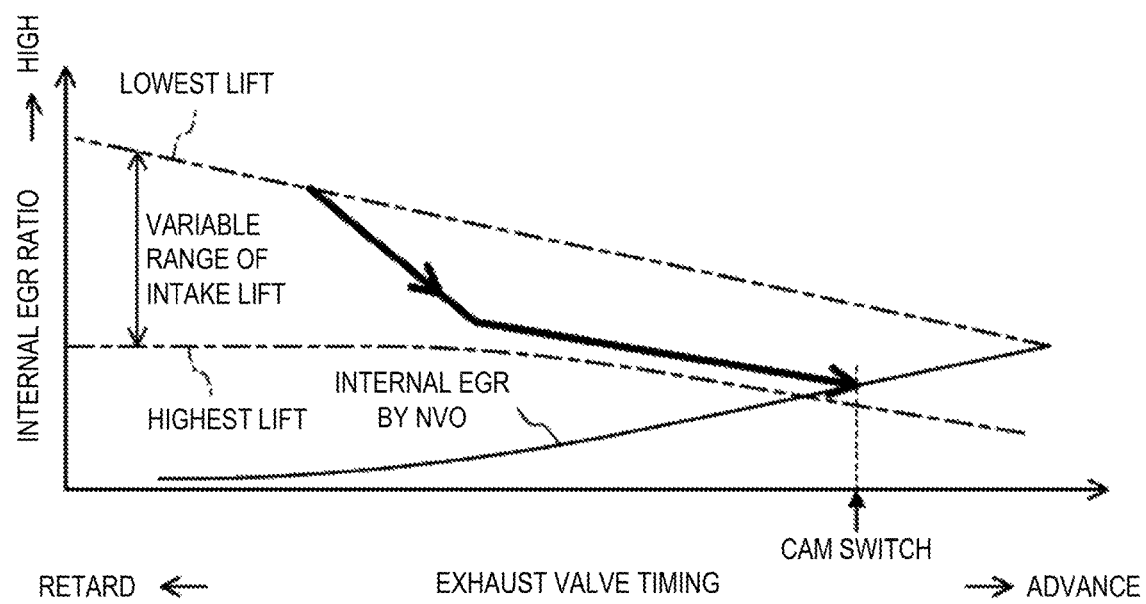
FIG. 13 is a chart illustrating a relationship between the operating timing of the exhaust valve and the internal EGR ratio when an operating state of the engine shifts from the non-boosted CI range to the boosted CI range.

FIG. 13 illustrates relationships between the operating timing of the exhaust valve 22 by the exhaust VVT 241 and the internal EGR ratio within the non-boosted CI range and the boosted CI range. In FIG. 13, the line "INTERNAL EGR BY NVO" indicates a relationship between the operating timing of the exhaust valve 22 and the internal EGR ratio when the internal EGR gas is introduced into the combustion chamber 17 by operating the exhaust VVL 242 in the first mode to provide the negative overlap period between the intake valve 21 and the exhaust valve 22. In this case, the negative overlap period becomes longer by advancing the operating timing of the exhaust valve 22, which increases the internal EGR ratio. Therefore, the line "INTERNAL EGR BY NVO" has a positive slope in FIG. 13.

In the case where the internal EGR gas is introduced into the combustion chamber 17 by operating the exhaust VVL 242 in the second mode to open the exhaust valve 22 on the intake stroke, when the operating timing of the exhaust valve 22 is advanced, the period in which the exhaust valve 22 is opened on the intake stroke is shortened, and therefore the internal EGR ratio decreases. On the other hand, when the operating timing of the exhaust valve 22 is retarded, the period in which the exhaust valve 22 is opened on the intake stroke is extended, and therefore the internal EGR ratio increases.

Here, while the exhaust VVL 224 operates in the second mode, when the lift of the intake valve 21 is changed, resistance against the flow of gas into the combustion chamber 17 through the intake valve 21 changes, and therefore, the internal EGR amount introduced into the combustion chamber 17 changes. For example, when the lift of the intake valve 21 is low, the internal EGR ratio increases because it becomes relatively easier for the exhaust gas to flow through the exhaust valve 22, whereas, when the lift of the intake valve 21 is high, the internal EGR ratio decreases because it becomes relatively easier for the fresh air to flow through the intake valve 21. Out of the two one-dotted chain lines in FIG. 13, the line "HIGHEST LIFT" indicates a change of the internal EGR ratio when the operating timing of the exhaust valve 22 is changed in the state where the intake valve 21 is at the highest lift. The line "LOWEST LIFT" indicates a change of the internal EGR ratio when the operating timing of the exhaust valve 22 is changed in the state where the intake valve 21 is at the lowest lift. Each of the lines "HIGHEST LIFT" and "LOWEST LIFT" has a negative slope in FIG. 13.

Further, as indicated by the vertical arrow between these lines in FIG. 13, even when the operating timing of the exhaust valve 22 is the same, the internal EGR ratio is changeable by controlling the lift of the intake valve 21.

As described above, at the boundary between the non-boosted CI range and the boosted CI range, the first and second cam parts 811 and 812 are switched therebetween so that the internal EGR ratio does not change before and after the switch. For example, the exhaust VVL 242 switches the cam part based on the control signal from the ECU 10 when the operating timing of the exhaust valve 22 is set to the given timing by the exhaust VVT 241. Within the non-boosted CI range, in view of reducing the pumping loss, the lift of the intake valve 21 is set to the given high lift as described above. As indicated by the thickest arrow in FIG. 13, the internal EGR ratio gradually decreases as the engine load increases and the operating timing of the exhaust valve 22 advances. Further, at the operating timing when the thickest arrow intersects with the line "INTERNAL EGR BY NVO," the internal EGR ratio when the exhaust VVL 242 operates in the second mode coincides with the internal EGR ratio when the exhaust VVL 242 operates in the first mode. Therefore, the second cam part 812 is switched to the first cam part 811 at this operating timing. By setting the lift of the intake valve 21 to be the high lift, in addition to the effect that the pump loss is reduced within the non-boosted CI range, the effect that the advanced amount of the exhaust valve 22 for achieving the switch from the second cam part 812 to the first cam part 811 is reduced is obtained as described above.

For example, in a situation of accelerating due to a step-in operation of the accelerator pedal, the operating state of the engine 1 promptly shifts from the non-boosted CI range to the boosted CI range and the boost by the boosting system 49 is promptly started. Thus, a response to an acceleration request from a vehicle driver is improved.

Further, when the exhaust VVL 242 operates in the second mode, the internal EGR ratio is adjusted by controlling the lift of the intake valve 21. Therefore, by adjusting the lift of the intake valve 21 in addition to adjusting the operating timing of the exhaust valve 22 as described above, it is reliably prevented that the internal EGR ratio is changed at the time of switching between the first cam part 811 and the second cam part 812. Moreover, even in a situation where the internal EGR ratio does not coincide by simply adjusting the operating timing of the exhaust valve 22 due to various factors, the internal EGR ratio coincides by adjusting the lift of the intake valve 21. Therefore, the switch between the first cam part 811 and the second cam part 812 is promptly performed.

Figure 14:
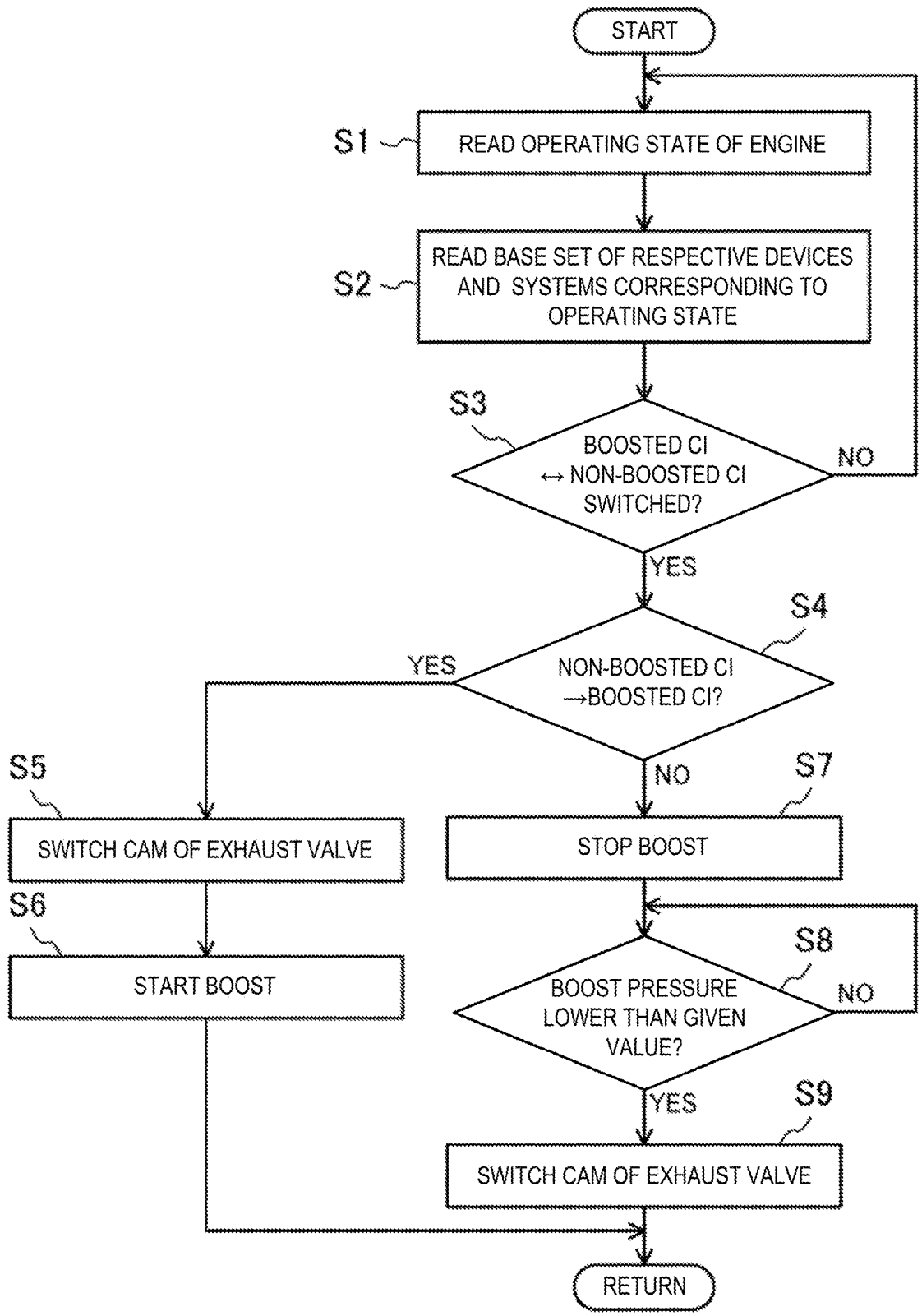
FIG. 14 is a flowchart regarding a control example of a variable valve operating system and a boosting system when the operating state of the engine shifts between the non-boosted CI range and the boosted CI range.

Next, the cam switch control between the non-boosted CI range and the boosted CI range is described with reference to a flowchart of FIG. 14. At S1, the ECU 10 reads the operating state of the engine 1 based on the detection signals inputted from the various sensors SW1 to SW16, etc.

Next at S2, the ECU 10 grasps the operating state required for the engine 1 based on the detection signals inputted from the various sensors SW1 to SW16, etc. The ECU 10 further reads a set of base control amounts of the respective devices (the injector 6, the spark plug 25, the fuel supply system 61, the throttle valve 43, and the EGR valve 54) and the respective systems (the variable valve operating systems (the intake VVT 231, the intake CVVL 232, the exhaust VVT 241, and the exhaust VVL 242) and the boosting system 49 (the electromagnetic clutch 45 and the air bypass valve 48)) corresponding to the operating state.

Next, at S3, the ECU 10 determines whether a requested operating state of the engine 1 requires switching between the non-boosted CI range and the boosted CI range. If the result is positive, the process proceeds to S4, whereas if the result is negative, the process returns to S1.

At S4, the ECU 10 determines if the switch is from the non-boosted CI range to the boosted CI range. If the result is positive, the process proceeds to S5, whereas if the result is negative, the process proceeds to S7.

At S5 resulted from the switch being from the non-boosted CI range to the boosted CI range, first, the ECU 10 outputs a control signal to the exhaust VVL 242 to switch the operating cam part from the second cam part 812 to the first cam part 811. Thus, the negative overlap period between the intake valve 21 and the exhaust valve 22 is provided.

Next, at S6, the ECU 10 outputs a control signal to the boosting system 49 to start the boost. Thus, the electromagnetic clutch 45 is connected and the booster 44 starts the boost.

Since the boosting system 49 starts the boost after the exhaust VVL 242 switches the cam part of the exhaust valve 22 as described above, within the boosted CI range, the blow-by of the intake air from the intake side to the exhaust side is prevented. As a result, the internal EGR ratio is adjusted accurately.

At S7, resulting from the switch being from the boosted CI range to the non-boosted CI range, the ECU 10 outputs a control signal to the boosting system 49 to stop the boost. Further at S8, the ECU 10 determines whether the boost pressure is lower than a given value. If the boost pressure is higher than the given value, S8 is repeated. If the boost pressure is lower than the given value, the process proceeds to S9.

At S9, the ECU 10 outputs a control signal to the exhaust VVL 242 to switch the operating cam part from the first cam part 811 to the second cam part 812. Thus, the exhaust valve 22 opens on the intake stroke. Since the boost pressure is low when the cam is switched, the blow-by of the intake air from the intake side to the exhaust side is prevented. As a result, the internal EGR ratio is adjusted accurately.

Note that, the art disclosed here is not limited to the application to the engine 1 having the above configuration. Various configurations may be adopted to the engine 1. For example, the above configuration includes the supercharger; however, alternatively, a turbocharger configured to drive by receiving exhaust energy may be provided.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine
10 ECU (Controller)

17 Combustion Chamber
21 Intake Valve
22 Exhaust Valve
221 Large Protruding Portion (First Cam Nose)
222 Flat Protruding Portion (Second Cam Nose)
223 Small Protruding Portion (Second Cam Nose)
231 Intake VVT (Variable Valve Operating System, Variable Valve Timing Mechanism)
232 Intake CVVL (Variable Valve Operating System, Lift Change Mechanism)
241 Exhaust VVT (Variable Valve Operating System, Variable Valve Timing Mechanism)
242 Exhaust VVL (Variable Valve Operating System)
44 Booster (Supercharger)
45 Electromagnetic Clutch
811 First Cam Part (First Cam)
812 Second Cam Part (Second Cam)
82 End Face Cam (Switch Mechanism)
83 Electromagnetic Actuator (Switch Mechanism)
49 Boosting System
SW1 Airflow Sensor
SW2 First Intake Air Temperature Sensor
SW3 First Pressure Sensor
SW4 Second Intake Air Temperature Sensor
SW5 Second Pressure Sensor
SW6 Pressure Sensor
SW7 Exhaust Temperature Sensor
SW8 Linear $O_2$ Sensor
SW9 Lambda $O_2$ Sensor
SW10 Water Temperature Sensor
SW11 Crank Angle Sensor
SW12 Accelerator Opening Sensor
SW13 Intake Cam Angle Sensor
SW14 Exhaust Cam Angle Sensor
SW15 EGR Pressure Difference Sensor
SW16 Fuel Pressure Sensor

What is claimed is:

1. A control device for a compression self-ignition combustion engine configured to combust mixture gas inside a combustion chamber by self-ignition, the control device comprising:
a variable valve operating system configured to introduce internal EGR gas into the combustion chamber by changing an opening operation of at least an exhaust valve out of an intake valve and the exhaust valve;
a boosting system configured to boost intake air introduced into the combustion chamber;
a controller configured to output a control signal to at least the variable valve operating system so as to operate the engine; and
a sensor connected to the controller and configured to detect a parameter related to an operating state of the engine and output a detection signal to the controller, wherein
an operation mode of the variable valve operating system is switchable between a first mode in which the exhaust valve is closed before a top dead center of exhaust stroke to confine the internal exhaust gas recirculation (EGR) gas inside the combustion chamber and a second mode in which the exhaust valve is opened on intake stroke to introduce the internal EGR gas into the combustion chamber,
in an operating range of the engine where the engine operates by self-ignition combustion, when an engine load is higher than a given load, the boosting system boosts the intake air introduced into the combustion chamber, and when the engine load is lower than the given load, the boost of the intake air is prevented, and
when the engine load is higher than the given load, the controller outputs a control signal to the variable valve operating system to cause the variable valve operating system to operate in the first mode, and when the engine load is lower than the given load, the controller outputs a control signal to the variable valve operating system to cause the variable valve operating system to operate in the second mode.

2. The control device of claim 1, wherein when an operating state of the engine shifts from the second range to the first range, the controller outputs control signals to the variable valve operating system and the boosting system to cause the variable valve operating system to switch the operation mode from the second mode to the first mode and the boosting system to start boosting the intake air after the operation mode is switched.

3. The control device of claim 1, wherein
the operating range where the engine operates by self-ignition combustion includes a first range and a second range where the engine load is lower than the first range, the boosting system boosts the intake air introduced into the combustion chamber within the first range, and the boost of the intake air is prevented within the second range, and
within the first range, the controller outputs a control signal to the variable valve operating system to cause the variable valve operating system to operate in the first mode, and within the second range, the controller outputs a control signal to the variable valve operating system to cause the variable valve operating system to operate in the second mode.

4. The control device of claim 3, wherein
the boosting system includes:
a supercharger that is driven by the engine; and
a clutch provided between the engine and the supercharger and configured to perform and interrupt transmission of driving force from the engine to the supercharger, and
the controller outputs a control signal to the clutch to cause the clutch to be connected after the operation mode of the variable valve operating system switches from the second mode to the first mode.

5. The control device of claim 1, wherein when the operating state of the engine shifts from the first range to the second range, the controller outputs a control signal to the variable valve operating system to cause the variable valve operating system to switch the operation mode from the first mode to the second mode after boost pressure of the boosting system drops to a given pressure.

6. The control device of claim 1, wherein
the engine operates by combusting the mixture gas at a theoretical air-fuel ratio by spark-ignition within a third range where the engine load is higher than the first range,
within the first range, the controller outputs a control signal to the boosting system so that boost pressure increases as the engine load increases, and
the controller outputs a control signal to the boosting system so that the boost pressure drops once at a timing when the operating state of the engine shifts from the first range to the third range.

7. The control device of claim 6, wherein
the boosting system boosts the intake air introduced into the combustion chamber within the third range, and within the third range, the controller outputs a control signal to the variable valve operating system to cause the variable valve operating system to operate in a third mode in which both of the intake and exhaust valves open around the top dead center of the exhaust stroke so as to scavenge exhaust gas inside the combustion chamber.

8. The control device of claim 1, wherein
the variable valve operating system includes:
- a first cam configured to be selected in the first mode and open the exhaust valve on the exhaust stroke;
- a second cam configured to be selected in the second mode and open the exhaust valve on the exhaust stroke and the intake stroke; and
- a switch mechanism configured to switch the operating cam between the first and second cams, and the controller outputs a control signal to the variable valve operating system to switch the operating cam between the first and second cams according to the operating state of the engine.

9. The control device of claim 8, wherein
the variable valve operating system includes a variable valve timing mechanism configured to change an operating timing of the exhaust valve, when the variable valve operating system operates in the first mode, an internal EGR ratio within the combustion chamber increases as the operating timing of the exhaust valve is advanced, when the variable valve operating system operates in the second mode, the internal EGR ratio increases as the operating timing of the exhaust valve is retarded, and when the operating timing of the exhaust valve is a specific operating timing, the internal EGR ratio in the first mode is the same as the internal EGR ratio in the second mode, and when the operating state of the engine shifts between the first range and the second range, the controller outputs a control signal to the variable valve operating system to cause the variable valve operating system to switch the operation mode between the first mode and the second mode when the operating timing of the exhaust valve is the specific operating timing.

10. The control device of claim 9, wherein the controller outputs a control signal to the variable valve operating system so that the internal EGR ratio continuously decreases as the engine load increases over the entire first and second ranges.

* * * * *